(12) United States Patent
Schemers et al.

(10) Patent No.: US 11,481,735 B1
(45) Date of Patent: Oct. 25, 2022

(54) VALIDATING, AGGREGATING, AND MANAGING CALENDAR EVENT DATA FROM EXTERNAL CALENDAR RESOURCES WITHIN A GROUP-BASED COMMUNICATION SYSTEM

(71) Applicant: Slack Technologies, Inc., San Francisco, CA (US)

(72) Inventors: Roland Schemers, Woodside, CA (US); James McPhail, San Francisco, CA (US); Lydia Han, San Francisco, CA (US)

(73) Assignee: Slack Technologies, LLC., San Francisco, CA (US)

( * ) Notice: Subject to any disclaimer, the term of this patent is extended or adjusted under 35 U.S.C. 154(b) by 243 days.

(21) Appl. No.: 16/263,753

(22) Filed: Jan. 31, 2019

(51) Int. Cl.
*G06Q 10/06* (2012.01)
*G06Q 10/10* (2012.01)
*H04L 51/08* (2022.01)

(52) U.S. Cl.
CPC ......... *G06Q 10/1093* (2013.01); *H04L 51/08* (2013.01)

(58) Field of Classification Search
CPC .............................. G06Q 10/06; G06Q 10/10
USPC ........................................................ 705/7.18
See application file for complete search history.

(56) References Cited

U.S. PATENT DOCUMENTS

| | | | |
|---|---|---|---|
| 9,940,394 B1 | 4/2018 | Grant et al. | |
| 2010/0010864 A1* | 1/2010 | Lee ...................... | G06Q 10/109 705/7.18 |
| 2011/0137700 A1* | 6/2011 | Hamalainen ......... | G06Q 10/109 705/7.18 |
| 2012/0084286 A1* | 4/2012 | Hubner .............. | G06Q 10/1093 707/737 |
| 2014/0372162 A1* | 12/2014 | Dhara ................ | G06Q 10/1095 705/7.19 |
| 2015/0058057 A1* | 2/2015 | Egan .................. | G06Q 10/1095 705/7.19 |
| 2015/0088784 A1* | 3/2015 | Dhara ...................... | G06N 5/02 706/11 |
| 2015/0100503 A1* | 4/2015 | Lobo .................... | G06Q 10/103 705/301 |
| 2015/0149544 A1* | 5/2015 | Zhang ................. | G06Q 10/109 709/204 |
| 2016/0140508 A1* | 5/2016 | Ossia ................. | G06Q 10/1095 705/7.19 |
| 2017/0039527 A1* | 2/2017 | Rangan ............. | G06Q 10/1095 |
| 2017/0300868 A1* | 10/2017 | Johnson ........... | G06Q 10/06314 |
| 2018/0287982 A1 | 10/2018 | Draeger et al. | |
| 2019/0340579 A1* | 11/2019 | Krystek ................ | G06N 3/088 |

OTHER PUBLICATIONS

Matsumoto, T. et al., "Chocoa Communicator—A New Communication System Based on Awareness and Text Communications-", Fujitsu Sci. Tech. J., 36, 2, (Dec. 2000) 154-161.

(Continued)

*Primary Examiner* — Nga B Nguyen

(74) *Attorney, Agent, or Firm* — Erise IP, P.A.

(57) ABSTRACT

Provided is an apparatus, computer implemented method, and computer program product configured to programmatically validate, aggregate, and manage calendar event data in a group-based communication interface of a group-based communication system.

20 Claims, 10 Drawing Sheets

(56) References Cited

OTHER PUBLICATIONS

U.S. Application filed May 24, 2017, In re: Grant et al. entitled Messaging Search and Management Apparatuses, Methods and Systems, U.S. Appl. No. 15/604,589.

U.S. Application filed May 24, 2017, In re: Grant et al. entitled Messaging Search and Management Apparatuses, Methods and Systems, U.S. Appl. No. 15/604,584.

U.S. Application filed Dec. 22, 2017, In re: Greene et al. entitled System, Apparatus, and Computer Program Product for Generating a Group-Based Communication Interface Having Improved Panes Positioned in a Defined Display Window, U.S. Appl. No. 15/853,376.

U.S. Application filed Apr. 20, 2018, In re: Morrison et al. entitled Methods, Apparatuses and Computer Program Products for Outputting Improved Autosuggestions in a Group-Based Communication Platform, U.S. Appl. No. 15/958,484.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

Robert Hof, "Stewart Butterfield On How Slack Became A $2.8 Billion Unicorn", Forbes, [online][retrieved May 9, 2019], Retrieved from the Internet: <URL https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d 1dd008c/?context=1000516, (dated Feb. 12, 2014, 7:03 PM), 2 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Internet Relay Chat, Wikipedia, , [online][retrieved May 30, 2019]. Retrieved from the Internet: <URL: https://en.wikipedia.org/wiki/Internet_Relay_Chat> (dated May 28, 2019) 17 pages.

Ernie Smith, "Picking Up The Slack", TEDIUM, [online][retrieved May 9, 2019], Retrieved from the Internet: <URL: https://tedium.co/2017/10/17/irc-vs-slack-chat-history/>. (dated Oct. 17, 2017) 8 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

"Die, Email, Die! A Flickr Cofounder Aims To Cut Us All Some Slack", Readwriteweb, Lexisnexis, https://advancelexis.com/api/permalink/33dd79e2-90f5-409d-ae27-5a2c7e86bf31/?context=1000516>. (dated Aug. 14, 2013, 4:15 PM) 2 pages.

\* cited by examiner

900

902

Generating a prioritization weight estimate for the prioritization data using a prioritization suggestion model, wherein the prioritization weight estimate comprises a plurality of topic-related weights, for the prioritization data corresponding to a topic work graph determined from the group-based communication system data corpus

904

Determining a prioritization score for the calendar event data object relative to the second prioritization score of the second calendar event data object based on the generated prioritization weight estimate, the calendar event contextual data, the second calendar event contextual data, and the prioritization data

906

Receiving feedback data regarding the prioritization score for the calendar event data object; and modifying the prioritization suggestion model using the feedback data

VALIDATING, AGGREGATING, AND MANAGING CALENDAR EVENT DATA FROM EXTERNAL CALENDAR RESOURCES WITHIN A GROUP-BASED COMMUNICATION SYSTEM

BACKGROUND

A variety of software programs, applications, platforms, or services provide electronic scheduling services to users operating client devices. Applicant has identified a number of deficiencies and technical conflicts associated with such electronic scheduling services. Through applied effort, ingenuity, and innovation, many of these identified problems have been solved by developing solutions that are included in embodiments of the present disclosure, many examples of which are described in detail herein.

BRIEF SUMMARY

Various embodiments of the present disclosure are directed to computer implemented methods, apparatuses, and computer program products for programmatically validating, aggregating, and managing calendar event data in a group-based communication interface.

For example, such embodiments are configured to receive a calendar event data object, parse the calendar event data object to identify calendar event contextual data, receive a second calendar event data object, and parse the second calendar event data object to identify second calendar event contextual data. Prioritization data is identified by querying a group-based communication system data corpus based on common identifier data shared between the calendar event contextual data and the second calendar event contextual data. The group-based communication system data corpus comprises group-based communication messaging data, group-based communication channel data, and group-based communication work object data.

In an example embodiment, computer implemented methods, apparatuses, and computer program products are configured for generating queries to a messaging communication knowledge domain to locate conceptually related group-based messaging communications associated with the one or more topics. Furthermore, embodiments discussed herein are configured to determine a prioritization score for the calendar event data object relative to a second prioritization score of the second calendar event data object based on the calendar event contextual data, the second calendar event contextual data, and the prioritization data.

BRIEF DESCRIPTION OF THE FIGURES

Reference will now be made to the accompanying drawings, which are not necessarily drawn to scale, and wherein:

FIG. 9 illustrates a flow diagram of example operations performed by a group-based communication server configured in accordance with some embodiments discussed herein.

DETAILED DESCRIPTION

Figure 1:
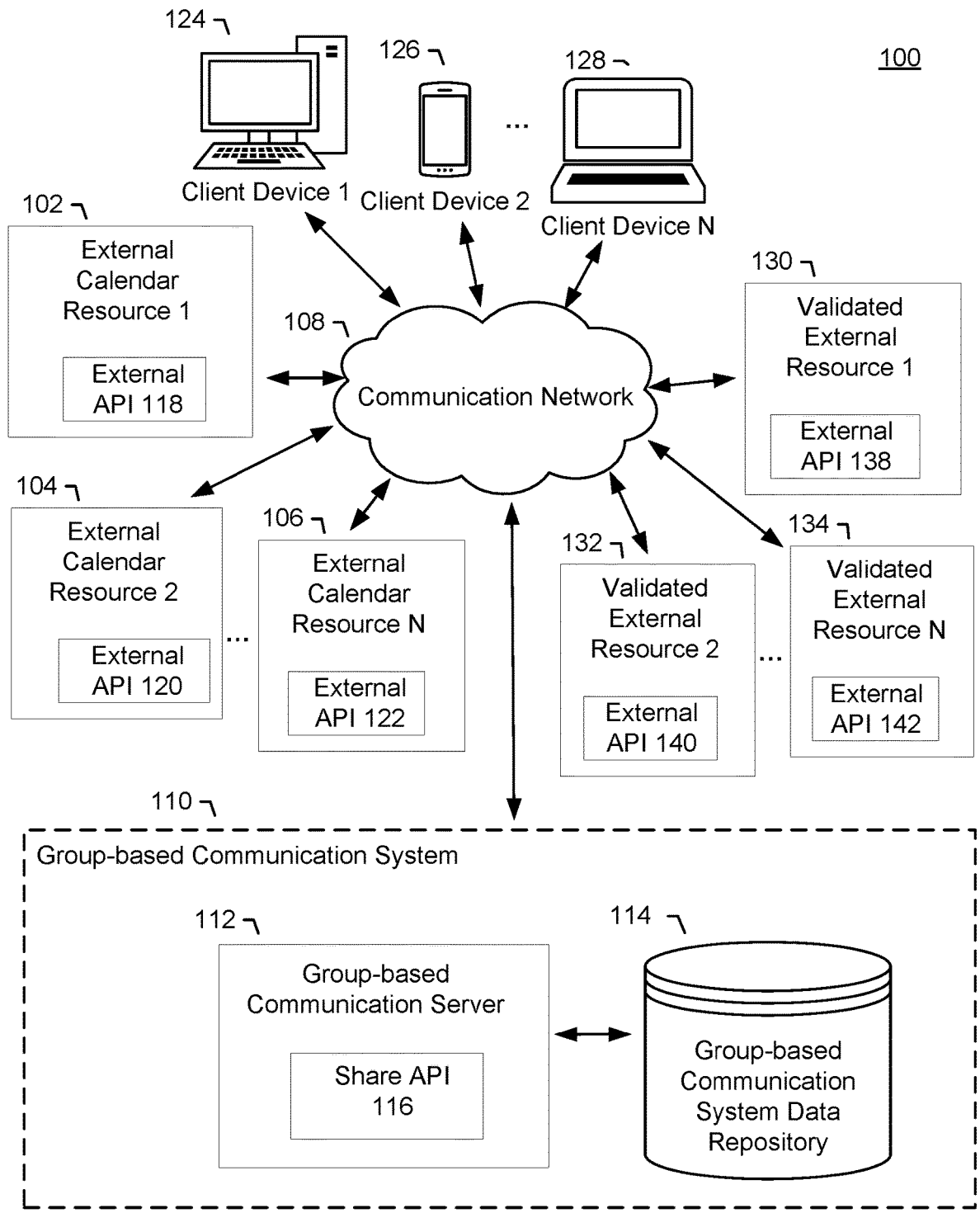
FIG. 1 illustrates an example system structured in accordance with some embodiments discussed herein.

Some embodiments of the present disclosure will now be described more fully hereinafter with reference to the accompanying drawings, in which some, but not all embodiments of the disclosures are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

Definitions

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers, client devices, and validated external resources.

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier is used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group- based communication interface comprises a plurality of group-based communication channels (e.g., a marketing channel, sales channel, accounting channel, etc.), which are defined below.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The terms "group-based communication channel identifier" or "channel identifier" refer to one or more items of data by which a group-based communication channel may be uniquely identified by a group-based communication system. For example, a group-based communication channel identifier may comprise American Standard Code for Information Interchange (ASCII) text, a pointer, a memory address, and the like. In one embodiment, the group-based communication channel identifier may be used to facilitate access control for the message (e.g., access to the message, such as during searches, may be restricted to users who joined the channel or who are allowed to join the channel). In another embodiment, the group-based communication channel identifier may be used to determine context for the message (e.g., a description of the channel, such as a description of a project discussed in the channel, may be associated with the channel identifier; a purpose of the channel, such as a channel purpose description, may be associated with the channel identifier; channel topics, such as discussed topics in the channel, may be associated with channel identifier).

The terms "group identifier" or "team identifier" refer to one or more items of data by which a group within a group-based communication system may be uniquely identified. For example, a group identifier may comprise ASCII text, a pointer, a memory address, and the like. In one embodiment, the group identifier associated with member users of a Slack Corporation workspace (i.e., a group-based communication interface) is 104356721.

The terms "message identifier" or "group-based message identifier" refer to one or more items of data by which a group-based message may be uniquely identified by a group-based communication system. For example, a message identifier may comprise American Standard Code for Information Interchange (ASCII) text, a pointer, a memory address, and the like.

The terms "external work object" or "remote work object" refer to a data structure or a dataset that is received from a validated external resource (defined below) to a group-based communication system for representing files, calls, tasks, events, messages, notifications, calendar events, and/or emails that a validated external resource transmits, posts, or shares on behalf of a group-based communication channel member for rendering to a group-based communication interface. An external work object comprises a file object, a call object, a task object, an event object, a message object, a notification object, an external calendar event data object (defined below), or an email object. An external work object is associated with a user identifier.

The term "work object contextual data" refers to data that is extracted or derived from an external work object that may affect the prioritization of an internal calendar event data object and/or an external calendar event data object. The group-based communication system is configured to identify prioritization data (defined below) based, at least in part, on the work object contextual data. The work object contextual data associated with an external work object comprises: title/subject information, date and time information, work object owner/creator information, work object type information (e.g., file, email, call, image, ticket, task, etc.), work object detail information that comprises text, images, audio, and file attachments, objects attached to the event (e.g., audio, file, video, tasks) or one or more predefined work object data fields. The work object contextual data may further include a validated external resource identifier, a user identifier, one or more group-based communication channel identifiers associated with group-based communication channels that the user has been granted access to, one or more group identifiers for groups with which the user is associated, message identifier, event identifier, or external work object identifier. The group-based communication system may be configured to further facilitate indexing the work object contextual data.

The terms "internal work object" or "group-based communication work object" refer to a data structure or a dataset created by the group-based communication system and reflects data about files, calls, tasks, events, messages, notifications, calendar events, and/or emails posted by a group-based communication channel member to a group-based communication interface. An internal work object comprises a file object, a call object, a task object, an event object, a message object, a notification object, an internal calendar event data object (defined below), or an email object. The internal work object is associated with one or more of a group-based communication channel member, a group-based communication message, a group-based communication channel, and another external or internal work object.

The terms "external calendar event data object" or "remote calendar event data object" refer to a data structure or a dataset that is received from an external calendar resource (defined below) to a group-based communication system for representing a calendar event. External calendar event contextual data (defined below) is derived from the external calendar event data object. An external calendar event data object further comprises an event identifier (defined below) and common identifier data (defined below). The form and use of calendar event data objects varies according to the external calendar resource. One example of a standard defining data structures for calendar event data objects and calendar data exchange is the iCalendar standard, known more formally as the Internet Calendaring and Scheduling Core Object Specification, RFC 2445. In the iCalendar standard, calendar data is stored in the top-level object, known as the Calendaring and Scheduling Core Object.

The term "internal calendar event data object" or "group-based communication calendar event data object" refers to a data structure or a dataset created by the group-based communication system and reflects data about a calendar event posted by a group-based communication channel member to a group-based communication interface. The internal calendar event data object is referenced by an event identifier (defined below). Calendar event contextual data (defined below) is derived from the internal calendar event data object.

The term "external calendar event contextual data" refers to data that is extracted or derived from an external calendar event data object that is used by a group-based communication system to position an associated calendar event in an aggregate calendar event interface of a group-based communication interface. The group-based communication system is configured to identify prioritization data (defined below) based, at least in part, on the external calendar event contextual data. The external calendar event contextual data associated with an external calendar event data object comprises: event title/subject information, topic information, event location information, event date and time information, event owner/organizer information, event attendee information and associated attendee responses, event type information (e.g., optional, required), event visibility (e.g., events on external calendar resource, events on group-based communication channels), alerts/reminders, event detail information that comprises text, images, audio, and file attachments, work objects attached to the event (e.g., a call, a file, a video, tasks, event, message, notification, email, another calendar event) or one or more predefined calendar data fields. The external calendar event contextual data may further include a user identifier, a device identifier, an external calendar resource identifier, one or more group identifiers for groups with which the user is associated, a message identifier, event identifier, or work object identifier. The group-based communication system may be configured to further facilitate indexing the external calendar event contextual data.

The term "internal calendar event contextual data" refers to data that is extracted or derived from an internal calendar event data object that is used by a group-based communication system to position an associated calendar event in an aggregate calendar event interface of a group-based communication interface. The group-based communication system is configured to identify prioritization data (defined below) based, at least in part, on the internal calendar event contextual data. The internal calendar event contextual data associated with an internal calendar event data object comprises: event title/subject information, event location information, event date and time information, event owner/organizer information, event attendee information and associated attendee responses, event type information (e.g., optional, required), event visibility (e.g., events on external calendar resource, events on group-based communication channels), alerts/reminders, event detail information that comprises text, images, audio, and file attachments, objects attached to the event (e.g., a call, a file, a video, tasks) or one or more predefined calendar data fields. The internal calendar event contextual data may further include a user identifier, one or more group-based communication channel identifiers associated with group-based communication channels that the user has been granted access to, one or more group identifiers for groups with which the user is associated, message identifier, event identifier, or work object identifier. The group-based communication system may be configured to further facilitate indexing the internal calendar event contextual data.

The term "common identifier data" refers to one or more data values of calendar event contextual data shared by two or more calendar event data objects that uniquely identify a common associated user. The data values, derived from two or more calendar event data objects, may be linked or matched, for example, based on: exact matching based on identifying data (e.g., event location information, event date and time information, event owner/organizer information, etc.); and/or statistical matching based on one or more similar characteristics (e.g., event title/subject information, calendar body/details, event attendee information, event type information etc.) shared by or in common with two or more calendar event data objects. The group-based communication system may identify prioritization data (defined below) by querying a group-based communication system data corpus based on the common identifier data shared between or among the respective calendar event contextual data of two or more calendar event data objects.

For example, if a query requesting information about common identifier data "Jane Doe" is submitted to for application to the group-based communication system data corpus, the group-based communication system is configured to use "Jane Doe" (or a unique identifier attributable to Jane Doe) as the basis of a query of the group-based communication system data corpus. A prioritization data response may thus be generated comprising, for example, group-based communication system user profile data that comprises a "CEO of Company ABC" job title field. As such, the group-based communication system is configured to identify Jane Doe as having a job title CEO of Company ABC as prioritization data that is indicative of a high priority sentiment across the group-based communication system data corpus. Such priority sentiment may be used by a prioritization suggestion model to score a calendar event data object having Jane Doe as the event owner/organizer or attendee to have a high prioritization score (defined below).

The term "prioritization data" refers to queried data of a group-based communication system data corpus that is determined based on, at least in part, common identifier data shared by the respective calendar event contextual data of two or more calendar event data objects. The common identifier data is used by the group-based communication system to identify a selected user of the group-based communication system. Prioritization data embodies a digital record of the selected user's engagement of and interaction with the group-based communication system and any associated validated external resources (defined below) and internal or external work objects. Prioritization data is a compiled set of data and data structure associations that reveal user associated insights concerning a calendar event data object. The group-based communication system is configured to identify prioritization data by querying a group-based communication system data corpus based on common identifier data shared by the respective calendar event contextual data of two or more calendar event data objects.

In one example, common identifier data may include a project name (or a unique identifier associated with a project) that is shared between two calendar event data objects. The group-based communication system is thus configured to query the group-based communication system data corpus to identify prioritization data (e.g., group-based communication messaging data, group-based communication channel data, group-based communication work object data, etc.) associated with the project. Potential identified prioritization data could include project status data, release plan data, feature list data, which could be used as a priority signal indicator for a priority suggestion model (defined below).

The term "prioritization score" refers to a data value representative of a programmatically generated level of importance of a calendar event data object in relation to other calendar event data objects. In certain embodiments, a group-based communication system determines a prioritization score for a calendar event data object relative to a prioritization score of another calendar event data object based on one or more of the calendar event contextual data, the calendar event contextual data associated with the another calendar event data object, the external work object contextual data, and the prioritization data. By way of example, in a possible embodiment, the prioritization score may be in the form of a set of values from 0 to N (e.g. 0 to 99, 0to 0.99, 0 to 5, etc.). The group-based communication system is then configured to transmit computer coded instructions for rendering an aggregate calendar event interface (defined below) of the group-based communication interface to provide visual indication of the prioritization score of the calendar event data object to a user of the aggregate calendar event interface. In an example embodiment, the prioritization score is expressed as general levels such as "low", "medium" or "high." For example, if the prioritization data value associated with the calendar event data object is below 50, or in a "low" range, the calendar event data object is assigned a "low" prioritization score. If the prioritization data value associated with the calendar event data object is above 75, or in a "high" range, the calendar event data object is assigned a "high" prioritization score.

The term "prioritization score ranking" refers to sorting, sequencing, or otherwise assigning a prioritization score rank to a calendar event data object (internal or external) to facilitate an ordering of importance of calendar event data objects. In an example embodiment, the prioritization score ranking refers to a prioritization score for a calendar event data object, used for ranking the calendar event data object relative to other calendar event data objects. For example, external calendar event data object ABC having a high prioritization score has a higher rank than an internal calendar event data object having a lower rank score.

A "work graph" is a graph-based knowledge representation data structure applied to the group-based communication system data corpus that comprises relationships between users, between users and group-based communication channels, between users and topics, between group-based communication channels and topics, between group-based communication channels, between topics, and/or the like. Attributes of work graph data may be represented as nodes while associations between such attributes are represented as edges. Work graph data may be used as machine learning (ML) structure inputs for training and/or utilizing ML structures (e.g., logistic regressions, neural networks, etc.). The group-based communication system may utilize message metadata, channel metadata, work object metadata, and/or ML structures to rank messages, users, channels, calendar event data objects, emails, tasks and/or the like for a variety of applications. For example, such applications may include prioritizing the most important calendar events in an aggregate calendar event interface of a group-based communication interface, and suggesting calendar events to accept or reject.

A "topic work graph" is a graph-based knowledge representation data structure applied to the group-based communication system data corpus that represents a user's associations to topics. Such topics may be drawn from group-based communication messaging data, group-based communication channel data, and group-based communication work object data. In some embodiments, topics may be identified from a group-based communication message. The message contents may be parsed (e.g., using PHP commands) to determine topics discussed in the message. For example, hashtags in the message may indicate topics associated with the message. In another example, the message may be analyzed (e.g., by itself, with other messages in a conversation primitive (defined below)) or parsed using a machine learning technique, such as topic modeling, to determine topics associated with the message. The topic work graph may indicate, for example, how many messages a user sent regarding a topic, how many messages the user read regarding the topic, how many reactions to the user's messages regarding the topic have been received, how many times files regarding the topic that were attached to the user's messages have been downloaded by other users, how many times files regarding the topic have been downloaded by the user, and relative strengths of the user's associations with such topics. This data structure may be used to calculate a prioritization weight estimate of the topic to the user. For example, a weighted average of user to topic data may be calculated for each topic (e.g., each topic discussed by the team, each topic discussed at the company), and the resulting scores normalized so that each of the topics is assigned a prioritization weight estimate (e.g., in the 0 to 1 range) from the perspective of the user.

A "user work graph" is a graph-based knowledge representation data structure applied to the group-based communication system data corpus that represents a user's associations to other users. Such other users may be drawn from group-based communication messaging data, group-based communication channel data, and group-based communication work object data. In one implementation, user to user data such as how many messages from another user the user read, how many messages of another user the user reacted to, how many direct messages the user sent to another user, how many channels the user and another user joined in common, and/or the like may be used to calculate a user priority (e.g., a user priority score) of another user to the selected user. For example, a weighted average of user to user data may be calculated for each of the other users from the perspective of the selected user, and the resulting scores normalized so that each of the other users is assigned a user priority score (e.g., in the 0 to 1 range) from the perspective of the user.

A "channel work graph" is a graph-based knowledge representation data structure applied to the group-based communication system data corpus that represents a user's associations to group-based communication channels. In another embodiment, such channel work graph may represent associations between channels without respect to a selected user. Returning to user-channel associations, in one example, the channel work graph may include associations developed based on whether the user joined a channel, how many messages the user sent in the channel, how many messages the user read in the channel, how often the user checks the channel, how recently the user participated in that channel, whether the user starred the channel, how similar the channel is to other channels the user participates in, and/or the like may be used to calculate a channel priority (e.g., a channel priority score) of the channel to the user. For example, a weighted average of user to channel data may be calculated for each channel (e.g., each channel accessible to the team, each channel accessible to the company), and the resulting scores normalized so that each of the channels is assigned a channel priority score (e.g., in the 0 to 1 range) from the perspective of the user.

A "prioritization suggestion model" is a group-based communication system based model for relational clustering that seeks to identify cluster structures for each work object or calendar data object based on the work graphs mentioned above. The prioritization suggestion model may be a ML model such as a supervised or unsupervised model, a neural network model, a dynamic clustering model, or the like. Upon application of the prioritization suggestions model, the group-based communication system is configured to proactively identify, validate, aggregate, prioritize, and suggest user participation in events that are associated with calendar event data objects. Such suggestions can be particularly important in an environment where multiple calendar events overlap preventing attendance in all events.

The term "aggregate calendar event interface" refers to an interface environment or component of a group-based communication interface that comprises assembled renderings of calendar event data objects from a plurality of external calendar resources. In one example, the aggregate calendar event interface provides a user of a client device a consolidated view of accepted calendar event data objects of high priority. The displayed accepted calendar event data objects may be determined by a group-based communication system.

The term "group-based communication messaging data" refers to data values that are stored as elements comprising electronically generated digital content objects provided by a channel member using a client device and that is configured for display within a group-based communication channel. Group-based communication messaging data may include any text, image, video, audio, or combination thereof provided by a channel member (using a client device). For instance, the channel member may provide a messaging communication that comprises text as well as an image and a video within the messaging communication as message contents. In such a case, the text, image, and video would comprise the messaging communication or digital content object. Each message transmitted or posted to a group-based communication channel of the group-based communication system comprises metadata comprising the following: a user identifier (defined below), a message identifier, message contents, a group identifier, and a group-based communication channel identifier. Each of the foregoing identifiers may comprise ASCII text, a pointer, a memory address, and the like. The message contents include any text, image, video, audio, mentions of other users and their respective user identifiers, calendar event data objects (defined below), work objects (defined below) or combination thereof A "user identifier" or "group-based communication user identifier" refers to one or more items of data by which a user may be identified within a group-based communication system. A user identifier is associated with a collection of messages that are created or accessed by a particular user (i.e., a client device associated with the particular user) within the group-based communication system. These messages may be analyzed to determine context regarding the user (e.g., the user's expertise or interest in a topic may be determined based on the frequency of mention of the topic or key words associated with the topic within such messages).

An "event identifier" is associated with one or more items of data by which an internal or external calendar event data object may be uniquely identified within a group-based communication system. For example, an event identifier may comprise ASCII text, a pointer, a memory address, and the like. In one embodiment, the event identifier associated with an external calendar event data object is encoded when transmitting to a validated external resource (defined below).

The term "group-based communication channel data" refers to data structure or corpus representing a set of group-based communication channels from one or more group-based communication interfaces of a group-based communication system. In one example, the group-based communication channel data embodies data and instructions sufficient for a group-based communication system to render a set of group-based communication channels to one or more group-based communication interfaces.

The term "private group-based communication channel" refers to a group-based communication channel with restricted access settings such that it is not generally accessible and/or searchable by other members of the group-based communication system (i.e., members associated with other group-based communication interfaces). For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The terms "validated external resource" or "validated remote resource" refer to a software program, application, platform, or service that is configured to communicate with the group-based communication system for providing service to a client device via a group-based communication interface. The validated external resource operates on a compiled code base or repository that is separate and distinct from that which supports the group-based communication system. In some embodiments, the validated external resource may communicate with the group-based communication system, and vice versa, through one or more application program interfaces (APIs). For example, the group-based communication system may subscribe to an API of the validated external resource that is configured to transmit one or more external work objects. In some embodiments, the validated external resource receives tokens or other authentication credentials that are used to facilitate secure communication between the validated external resource and the group-based communication system in view of group-based communication system network security layers or protocols (e.g., network firewall protocols).

The term "external calendar resource" refers to a software program, application, platform, or service that is configured to provide electronically calendared event services to users operating client devices. The external calendar resource comprises a calendar client, a calendar access protocol (CAP) server or web calendar access protocol (WCAP) server, and a domain name server ("DNS"). The external calendar resource is configured to allow a sending user ("a sender") to create and transmit an electronically calendared event to a receiving user ("a recipient"). Each event comprises subject information, location information, a start time, an end time, attendee information, and a calendar body that comprises text, images, and file attachments. The external calendar resource operates on a compiled code base or repository that is separate and distinct from that which supports the group-based communication system. Example external calendar resources include iCal® application of Apple®, Inc., Microsoft® Office Outlook™ Calendar of Microsoft Corporation, and Google Calendar of Google, Inc. An external calendar resource is associated with an external calendar resource account which is an authorized account on the external calendar resource. An external calendar resource account may contain one or more calendars (e.g., personal, business, work, etc.).

The term "external resource corpus" refers to a collection of validated external resources and external calendar resources. Each corpus can include data of multiple types (e.g., group-based communication corpus can include group-based communication messaging data, group-based communication channel data, and group-based communication work object data). A search engine of the group-based communication system searches the external resource corpus to search validated external resources and/or external calendar resources based on content of the external calendar resources, calendar event contextual data, and/or work object contextual data. Search results resulting from a search of the external resource corpus include name or title of external resource, a calendar object, an external work object, an external resource account which is an authorized account on the external calendar or the validated external resource, tokens or other authentication credentials, subscription information and a group-based communication user identifier. Subscription information may specify one or more specific calendar event data objects and/or external work objects of the respective external calendar resources and validated external resource for which notification is requested; and what data change events are monitored (e.g., event date and time rescheduling, cancellation, attendee responses).

The term "conversation primitive" is associated with a message and refers to an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitives may be determined based on analysis of topics discussed in the message and other messages (e.g., in the channel) and/or proximity (e.g., message send order proximity, message send time proximity) of these messages. The conversation primitives are also used for shingling and searching over conversations (the messages and their surrounding messages).

The terms "computer-readable storage medium" or "non-transitory memory medium" refers to a non-transitory, physical or tangible storage medium (e.g., volatile or non-volatile memory), which may be differentiated from a "computer-readable transmission medium," which refers to an electromagnetic signal.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emoj is, a plurality of conversations, a plurality of conversation topics, an graphical representation, an email address, a real name (e.g., John Doe), a username (e.g., jdoe), a password, a real name, a time zone, a status, and the like. The user account details can include a subset designation of user credentials, such as, for example, login information for the user including the user's username and password.

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

Overview

Various embodiments of the present disclosure are directed to computer implemented methods, apparatuses, and computer program products for programmatically validating, aggregating, and managing calendar event data in a group-based communication interface. For example, a group-based communication server as described herein is configured to receive a calendar event data object, parse the calendar event data object to identify calendar event contextual data, receive a second calendar event data object, and parse the second calendar event data object to identify second calendar event contextual data. The group-based communication server then identifies prioritization data by querying a group-based communication system data corpus based on common identifier data shared between the calendar event contextual data and the second calendar event contextual data. The prioritization data is used to determine a prioritization score for the calendar event data object relative to the second calendar event data object.

Programmatic scoring technologies of the type discussed herein enable a group-based communication server to automatically accept and/or prioritize dozens of calendar data objects directed to a selected user or team thereby reducing or eliminating calendar event conflict and freeing up resources. In some embodiments, prioritization scores are determined based on prioritization weight estimates that are developed from a prioritization suggestion model trained using group-based communication messaging data, group-based communication channel data, and group-based communication work object data.

In one example embodiment, the group-based communication server is configured to assemble a variety of internal calendar event data objects with external calendar event data objects to create an aggregate calendar event interface that is configured for rendering to a group-based communication interface. Such embodiments utilize a specifically configured share application programming interface (API) to ingest or receive external calendar event data objects. By utilizing this specifically configured share API, the exemplary embodiments may identify and extract relevant calendar event contextual data from any received external calendar event data object. Once extracted, the calendar event contextual data may be indexed in group-based communication system data repository 114 of the group-based communication system.

Various embodiments of the present disclosure provide a number of technological improvements. For example, by rendering an aggregate calendar event interface to a group-based communication interface, embodiments of the disclosure avoid burdening device and network resources with frequent simultaneous running of multiple external resource applications. System resources may also be freed-up by reducing scheduling overlap and conflicts between various internal and external event data objects.

Exemplary Architecture & Apparatuses

Computer implemented methods, apparatuses, and computer program products of the present disclosure may be embodied by any of a variety of devices. For example, the computer implemented method, apparatus, and computer program product of an example embodiment may be embodied by a networked device (e.g., a group-based communication server), such as a server or other network entity, configured to communicate with one or more devices, such as one or more client devices and/or one or more external calendar resources. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 110 via a communications network 108 using client devices 1-N. The group-based communication system 110 may comprise a group-based communication server 112 that is disposed in communication with at least one group-based communication system data repository 114.

Typically, users using client device 1-N will access and communicate with one or more external calendar resources 102-106 and/or one or more validated external resources 130-134 through communications network 108. In some examples, external calendar resources 102-106 may include iCal® application of Apple®, Inc., Microsoft® Office Outlook™Calendar of Microsoft Corporation, and Google® Calendar of Google, Inc, and the like. In some examples, validated external resources 130-134 may include Jira of Atlassian, Trello of Atlassian, SharePoint of Microsoft Corporation, VersionOne by CollabNet, Dropbox and the like, The external calendar resources 102-106 are separate network entities from the group-based communication system 110. For example, the external calendar resources 102-106 and the group-based communication system 110 are hosted by and operated by devices or servers. Communication with the external calendar resources 102-106 is typically provided via application programming interfaces (APIs) provided by the external calendar resources 102-106 as depicted by APIs 118-122. The validated external resources 130-134 are separate network entities from the group-based communication system 110. For example, the validated external resources 130-134 and the group-based communication system 110 are hosted by and operated by devices or servers. Communication with the validated external resources 130-134 is typically provided via application programming interfaces (APIs) provided by the validated external resources 130-134 as depicted by APIs 138-142. In various embodiments, the APIs 118, 120, and 122 define the protocol and procedural steps by which external calendar resources 102-106 may make its calendar event data objects available for access/ingestion by the group-based communication system 110. APIs 138, 140, and 142 also define the protocol and procedural steps by which validated external resources 130-134 make its external work objects available for access/ingestion by the group-based communication system 110.

The external calendar resources 102-106 provide calendar service(s) via one or more external calendar applications accessed over the communications network 108 such as for creating, reading, writing, accepting, rejecting, and deleting calendar events. The validated external resources 130-134 provide a variety of project management service(s), file hosting services, and the like via one or more external software products accessed over the communications network 108.

A share API 116 of the group-based communication server 112 facilitates sharing of external work objects among and between the group-based communication system 110 and the validated external resources 130-134. The share API 116 further defines the security and authentication protocols that govern communications between the validated external resources 130-134 and the group-based communication system. In various embodiments, the share API 116 comprises all or part of the API handler circuitry discussed in connection with FIG. 2.

Communications network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 108 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Web socket channel. In some embodiments, the protocol is JSON over RPC ("remote procedural call"), JSON over REST ("Representational State Transfer")/HTTP ("HyperText Transfer Protocol"), and the like.

The group-based communication server 112 may be embodied as a computer or group of computers. The group-based communication server 112 may provide for receiving of electronic data from various sources, including but not necessarily limited to the client devices 1-N. For example, the group-based communication server 112 may be operable to receive and post or transmit group-based messaging communications provided by the client devices 1-N.

The group-based communication system data repository 114 may be embodied as a data storage device such as a Network Attached Storage (NAS) device or devices, or as a separate database server or servers. The group-based communication system data repository 114 comprises information accessed and stored by the group-based communication server 112 to facilitate the operations of the group-based communication system 110. For example, the group-based communication system data repository 114 may include, without limitation, a plurality of group-based communication corpuses. Each group-based communication corpus comprising group-based communication messaging data, group-based communication channel data, and group-based communication work object data.

The client devices 1-N may be any computing device as defined above. Electronic data received by the group-based communication server 112 from the client devices 1-N may be provided in various forms and via various methods. For example, the client devices 1-N may include desktop computers, laptop computers, smartphones, netbooks, tablet computers, wearables, and the like.

In embodiments where a client device 1-N is a mobile device, such as a smartphone or tablet, the client device 1-N may execute an "app" to interact with the group-based communication system 110. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 1-N may interact with the group-based communication system 110 via a web browser. As yet another example, the client device 1-N may include various hardware or firmware modules designed to interface with the group-based communication system 110.

In some embodiments of a group-based communication system 110, a message or messaging communication may be sent from a client device 1-N to a group-based communication system 110. In various implementations, the message may be sent to the group-based communication system 110 over communications network 108 directly by a client device 1-N (124-128), the message may be sent to the group-based communication system 110 via an intermediary such as a message server, and/or the like. For example, the client device 1-N (124-128) may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), external calendar resource metadata, and/or the like. In one embodiment, the client device 1-N (124-128) may provide the following example message, substantially in the form of a (Secure) Hypertext Transfer Protocol ("HTTP(S)") POST message including eXtensible Markup Language ("XML") formatted data, as provided below:

POST /authrequest.php HTTP/1.1
Host: www.server.com
Content-Type: Application/XML
Content-Length: 667
<?XML version="1.0" encoding="UTF-8"?>
<auth_request>
<timestamp>2020-12-31 23:59:59</timestamp>
<user_accounts_details>
　<user_account_credentials>
　　<user_name>ID_user 1</user_name>
　　<password>abc123</password>
　　//OPTIONAL<cookie>cookieID</cookie>
　　//OPTIONAL<digital_cert_link>www.mydigital-
　　　certificate.com/
JohnDoeDaDoeDoe@gmail.com/mycertifcate.dc</digital_cert_link>
　　//OPTIONAL<digital_certificate>_DATA_</digi-
　　　tal_certificate>
　</user_account_credentials>
</user_accounts_details>
<client_details>//iOS Client with App and Webkit
　//it should be noted that although several client details
　//sections are provided to show example variants of
　　client
　//sources, further messages will include only on to save
　//space
　<client_IP>10.0.0.123</
　　client_IP><user_agent_string>Mozilla/5.0 (iPhone;
　　CPU iPhone OS 7_1_1 like Mac OS X)
　AppleWebKit/537.51.2 (KHTML, like Gecko) Version/
7.0 Mobile/11D201
　Safari/9537.53</user_agent_string>
　<client_product_type>iPhone6,1</client_product_type>

```
<client serial number>DNXXX1X1XXXX</client_serial_number>
<client_UDID>3XXXXXXXXXXXXXXXXXXXXXXXXD</client_UDID>
<client_OS>iOS</client_OS>
1 client_OS_version>7.1.1</client_O_S_version>
<client_app_type>app with webkit</client_app_type>
<app_installed_flag>true</app_installed_flag>
<app_name>nickname.app</app_name>
<app_version>1.0</app_version>
<app_webkit_name>Mobile Safari</client_webkit_name>
<client_version>537.51.2</client_version>
</client_details>
<client_details>//iOS Client with Webbrowser
<client_IP>10.0.0.123</client_IP>
<user_agent_string>Mozilla/5.0 (iPhone; CPU iPhone OS 7_1_1 like Mac OS X)
AppleWebKit/537.51.2 (KHTML, like Gecko) Version/7.0 Mobile/11D201 Safari/9537.53</user_agent_string>
<client_product_type>iPhone6,1</client_product_type>
<client_serial_number>DNXXX1X1XXXX</client_serial_number>
<client_UDID>3XXXXXXXXXXXXXXXXXXXXXXXXD</client_UDID>
<client_OS>iOS</client_OS>
<client_OS_version>7.1.1</client_OS_version>
<client_app_type>web browser</client_app_type>
<client_name>Mobile Safari</client_name>
<client_version>9537.53</client_version>
</client_details>
<client_details>//Android Client with Webbrowser
<client_IP>10.0.0.123</client_IP>
<user_agent_string>Mozilla/5.0 (Linux; U; Android 4.0.4; en-us; Nexus S
Build/IMMI76D) AppleWebKit/534.30 (KHTML, like Gecko) Version/4.0 Mobile Safari/534.30</user_agent_string>
<client_product_type>Nexus S</client_product type>
<client_serial_number>YXXXXXXXXZ</client_serial_number>
<client_UDID>FXXXXXXXXX-XXXX-XXXX-XXXX-XXXXXXXXXXXX</client_UDID>
<client_OS>Android</client_OS>
<client_OS_version>4.0.4</client_OS_version>
<client_app_type>web browser</client_app_type>
<client_name>Mobile Safari</client_name>
<client_version>534.30</client_version>
</client_details>
<client_details>//Mac Desktop with Webbrowser
<client_IP>10.0.0.123</client_IP>
<user_agent_string>Mozilla/5.0 (Macintosh; Intel Mac OS X 10_9_3)
AppleWebKit/537.75.14 (KHTML, like Gecko) Version/7.0.3 Safari/537.75.14</user_agent_string>
<client_product_type>MacPro5,1</client_product_type>
<client_serial_number>YXXXXXXXXZ</client_serial_number>
<client_UDID>FXXXXXXXXX-XXXX-XXXX-XXXX-XXXXXXXXXXXX</client_UDID>
<client_OS>Mac OS X</client_OS>
<client_OS_version>10.9.3</client_OS_version>
<client_app_type>web browser</client_app_type>
<client_name>Mobile Safari</client_name>
<client_version>537.75.14</client_version>
</client_details>
<message>
<message_identifier>ID_message_10</message_identifier>
<team_identifier>ID_team_1</team_identifier>
<channel_identifier>ID channel_1</channel_identifier>
<contents>That is an interesting disclosure. I have attached a copy our patent policy.</contents>
<attachments>patent_policy.pdf</attachments>
</message>
</auth_request>
```

The group-based communication system 110 comprises at least one group-based communication server 112 that may create a storage message based upon the received message to facilitate message indexing and storage in the group-based communication system data corpus 114. In one implementation, the storage message may include data such as a message identifier, a group identifier, a group-based communication channel identifier, a sending user identifier, topics, responses, message contents, attachments, message hierarchy data, external calendar resource metadata, conversation primitive data, and/or the like. For example, the group-based communication server 112 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version="1.0" encoding="UTF-8"?>
<storage_message>
<message_identifier>ID message_10</message_identifier>
<team_identifier>ID_team_1</team_identifier>
<channel_identifier>ID_channel 1</channel_identifier>
<sending_user_identifier>ID user_1</sending_user_identifier>
<topics>
<topic>disclosures</topic>
<topic>patents</topic>
<topic>policies</topic>
</topics>
<responses>
<response>liked by ID user_2</response>
<response>starred by ID user_3</response>
</responses>
<contents>That is an interesting disclosure. I have attached a copy our patent policy.</contents>
<attachments>patent_policy.pdf</attachments>
<conversation_primitive>
conversation includes messages: ID_message_8, ID_message_9, ID_message_10, ID_message_11, ID_message_12
</conversation_primitive>
</storage_message>
```

In some embodiments, a group identifier as defined above may be associated with the message. A group-based communication channel identifier as defined above may also be associated with the message. A sending user identifier as defined above may be associated with the message. In one implementation, the message may be parsed (e.g., using PHP—i.e., the script language derived from Personal Home Page Tools—commands) to determine a sending user identifier of the user who sent the message.

In various embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, a conversation primitive may be associated with the message. In one implementation, a conversation primitive is an element used to analyze, index, and/or store messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication system data corpus 114). In one implementation, a storage message may be sent from group-based communication server 112 to facilitate indexing in group-based communication system data repository 114. In another implementation, metadata associated with the message may be determined and the message may be indexed in group-based communication system data repository 114. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication system data repository 114 to facilitate searching. In one embodiment, the files may be indexed such that a company's or a group's files are indexed at a separate distributed repository. In still another embodiment, the files may be indexed such that a user's files are indexed at a separate distributed repository.

Examples of messaging search and management apparatuses and methods for use with embodiments of the present disclosure are disclosed in U.S. patent application Ser. No. 15/604,584, titled "MESSAGING SEARCH AND MANAGEMENT APPARATUSES, METHODS AND SYSTEMS," filed May 24, 2017, U.S. patent application Ser. No. 15/604,589, titled "MESSAGING SEARCH AND MANAGEMENT APPARATUSES, METHODS AND SYSTEMS," filed May 24, 2017, and U.S. patent application Ser. No. 15/651,887, titled "MESSAGING SEARCH AND MANAGEMENT APPARATUSES, METHODS AND SYSTEMS," filed Jul. 17, 2017, the contents of which are incorporated herein by reference in their entirety. The examples include metadata extraction and work graph generation, as well as application of machine learning techniques for embodiments of the present disclosure.

Example Apparatus for Implementing Embodiments of the Present Disclosure

Figure 2:
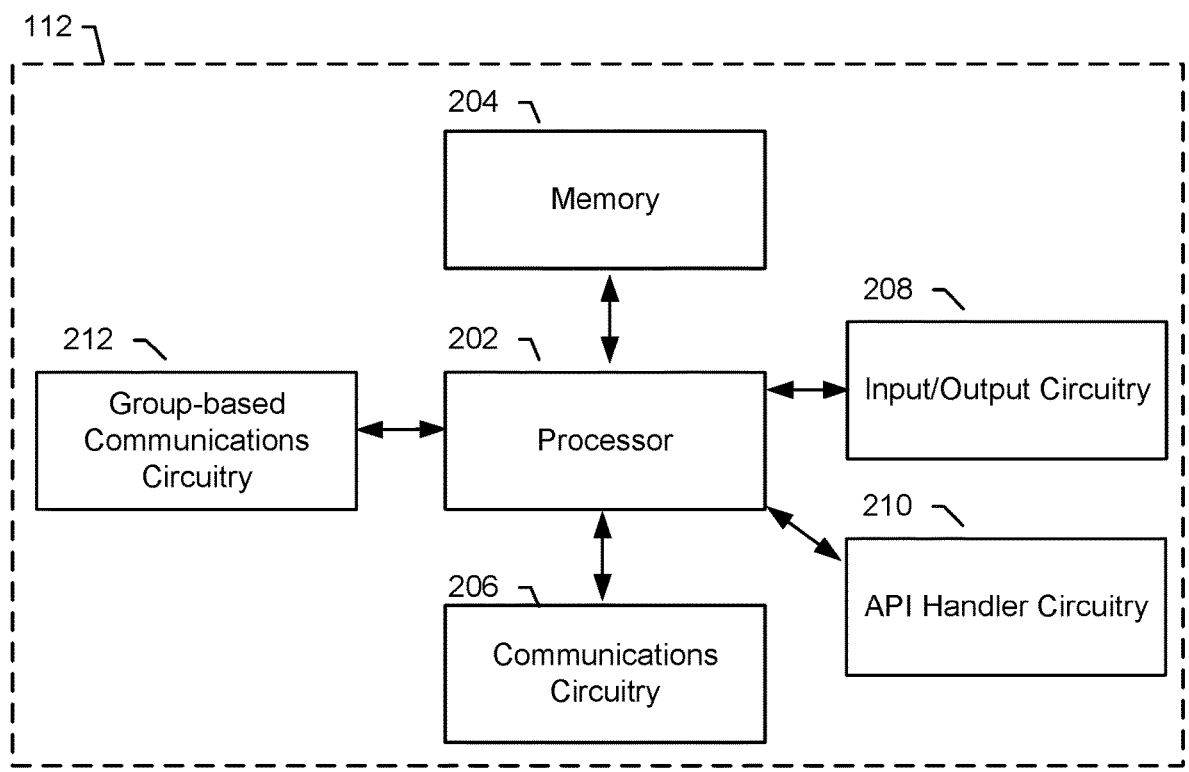
FIG. 2 illustrates a schematic block diagram of circuitry that can be included in a group-based communication server structured in accordance with some embodiments discussed herein.

FIG. 2 shows a schematic block diagram of circuitry 200, some or all of which may be included in, for example, group-based communication server 112. Any of the aforementioned systems or devices may include the circuitry 200 and may be configured to, either independently or jointly with other devices in a communications network 108 perform the functions of the circuitry 200 described herein. As illustrated in FIG. 2, in accordance with some example embodiments, circuitry 200 may comprise various means, such as processor 202, a memory 204, input/output circuitry 208, communications circuitry 206, API handler circuitry 210, and group-based communication circuitry 212. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 206 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, computer coded instructions, or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of computer coded instructions, pipelining, and/or multithreading. The use of the term "processing circuitry" may be understood to include a single core processor, a multi- core processor, multiple processors internal to the apparatus, and/or remote or "cloud" processors.

In an example embodiment, the processor 202 may be configured to execute computer coded instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the computer coded instructions may specifically configure the processor to perform the algorithms and/or operations described herein when the computer coded instructions are executed.

As just one example, the processor 202 may be configured to maintain one or more communication channels connecting a plurality of client devices 1-N to enable message sharing there between. The processor 202 ensures that messages intended for exchange between the client devices 1-N within the particular communication channel are properly disseminated to those client devices 1-N for display within respective display windows provided via the client devices 1-N.

Moreover, the processor 202 may be configured to synchronize messages exchanged on a particular communication channel with a database for storage and/or indexing of messages therein. In certain embodiments, the processor 202 may provide stored and/or indexed messages for dissemination to client devices 1-N.

In some embodiments, the apparatus 200 may include input/output circuitry 208 that may, in turn, be in communication with processor 202 to provide output to the user and, in some embodiments, to receive an indication of a user input. The input/output circuitry 208 may comprise a user interface and may include a display and may comprise a web user interface, a mobile application, a client device, a kiosk, or the like. In some embodiments, the input/output circuitry 208 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 212 comprises hardware configured to support a group-based communication system. The group-based communication circuitry 212 may utilize processing circuitry, such as the processor 202, to perform these actions. The group-based communication circuitry 212 may send and/or receive data from group-based communication system data repository 114. In some implementations, the sent and/or received data may be of group-based communication messages and/or internal work objects organized among a plurality of group-based communication channels. It should also be appreciated that, in some embodiments, the group-based communication circuitry 212 may include a separate processor, specially configured field programmable gate array (FPGA), or application specific interface circuit (ASIC).

The API handler circuitry 210 is operable to handle the various API calls 118, 120, 122, 138, 140, and 142 from the external calendar resources 102-106 and the validated external resources 130-134. For example, the API handler circuitry 210 may handle an API call to update a group-based communication member or an internal work object. In one embodiment, when the API handler circuitry 210 receives an API call to update a calendar event data object, an authentication module (not pictured) may authenticate the external calendar resource for which the calendar event data object is being received. For example, when the API call is received, the authentication module may authenticate the group-based communication member associated with the calendar event data object to confirm the identity of the group-based communication member and that the group-based communication member has consented to update the calendar specific data as part of the calendar event data object. Alternatively, the authentication module may have already authenticated the external calendar resource to facilitate secure communication between the external calendar resource and the group-based communication system in view of group-based communication system network security layers or protocols (e.g., network firewall protocols). In this regard, the group-based communication circuitry 212 is configured to subscribe to an API of an external calendar resource to receive updates in the form of external calendar event data objects.

In one example embodiment, the group-based communication circuitry 212 is configured to push or transmit the updates to a data buffer pool. Updates in the data buffer pool include all possible changes in all calendar event data objects. However, it is desired to give priority to specific updates such as (e.g., event date and time rescheduling, cancellation, event details changes, location changes, and the like). The group-based communication sever 112 is configured to filter the updates before the programmatic step of parsing the external calendar event data object to identify external calendar event contextual data. For example an update to the location of a calendar event may be more impactful to the user than an event reminder set to alert the user of the meeting start time, and as such may affect the prioritization score of the calendar event. As such the group-based communication server may consider a subset of external calendar event contextual data when determining a prioritization score.

In another example embodiment, the group-based communication circuitry 212 is configured to receive only specific data change events (e.g., event date and time rescheduling, cancellation, attendee responses). If no calendar event data object change events or updates are specified, retrieval is considered for all possible changes in all calendar event data objects.

In another example embodiment, an authentication token may authorize a validated external resource hosting/storing an external work object to communicate with the group-based communication system 110 (e.g., access a pointer and/or a memory address or the like to one or more group-based communication channels). The group-based communication circuitry 212 may be configured to subscribe to an API of a validated external resource to receive updates in the form of external work objects.

In one example embodiment, the group-based communication circuitry 212 is configured to push or transmit the external work object updates to a data buffer pool. Updates in the data buffer pool include all possible changes in all external work objects. However, it is desired to give priority to specific updates such as (e.g., ticket rescheduling, ticket cancellation, ticket detail changes, ticket prioritization changes, and the like). The group-based communication sever 112 is configured to filter the updates before the programmatic step of parsing the external work object to identify work object contextual data. For example an update to the due date of JIRA ticket may be more impactful to the user than a change of the system tester assigned to the JIRA ticket, and as such may affect the prioritization score of the external work object. As such the group-based communication server may consider a subset of work object contextual data when determining a prioritization score.

In another example embodiment, the group-based communication circuitry 212 is configured to receive only specific data change events (e.g., ticket rescheduling, ticket cancellation, ticket detail changes, ticket prioritization changes, and the like). If no external work object change events or updates are specified, retrieval is considered for all possible changes in all external work object from the validated external resources.

After the external calendar resource and/or the validated external resource has been authorized and registered by the group-based communication system 110, subscription information regarding changes occurring at the external calendar resource and the validated external resource are provided in the form of calendar event data objects and external work objects, respectively. Such calendar event data objects and external work objects may be provided in real-time or may be stored to a storage repository and provided in batch to the group-based communication system.

In one embodiment, group-based communication circuity (or the API handler circuitry on its behalf) may request that an external calendar resource or a validated external resource provide updates in the form of calendar event data objects and external work objects upon creation, deletion, or change of selected data. In one example embodiment, subscription information specifies one or more specific calendar event data object and/or external work object of the respective external calendar resources and validated external resource for which notification is requested; and further specifies what data change events are monitored (e.g., event date and time rescheduling, cancellation, attendee responses). If no calendar event data object and/or external work object is specified, notification is considered to be requested for all possible changes in all calendar event data objects and/or external work objects.

Figure 3:
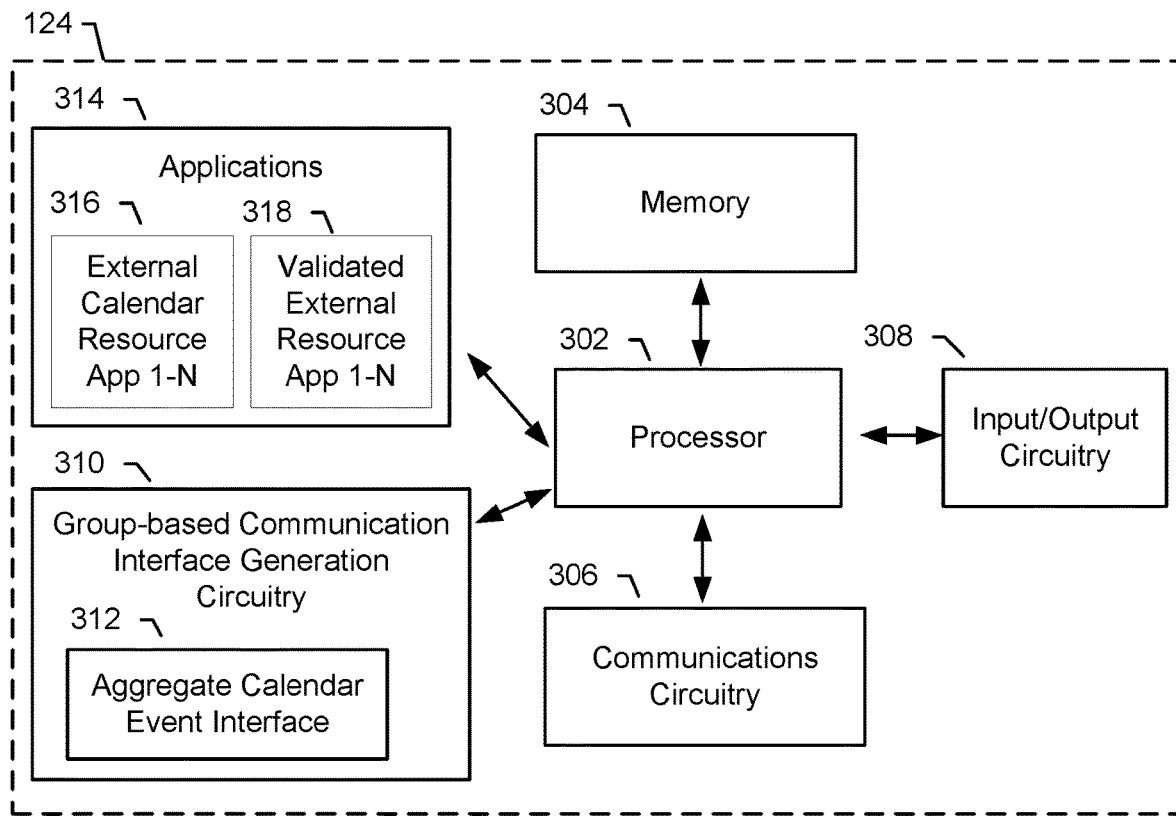
FIG. 3 illustrates a schematic block diagram of circuitry that can be included in a client device structured in accordance with some embodiments discussed herein.

FIG. 3 shows a schematic block diagram of circuitry 300, some or all of which may be included in, for example, client devices 1-N. Any of the aforementioned systems or devices may include the circuitry 300 and may be configured to, either independently or jointly with other devices in a communications network 108 perform the functions of the circuitry 300 described herein. As illustrated in FIG. 3, in accordance with some example embodiments, circuitry 200 can include various means, such as processor 302, a memory 304, input/output circuitry 308, communications circuitry 306, application 314, and group-based communication interface generation circuitry 310.

The apparatus 300 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 302 may provide processing functionality, the memory 304 may provide storage functionality, the communications circuitry 306 may provide network interface functionality, and the like.

In some embodiments, the processor 302 (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, computer coded instructions, or the like, for enabling the apparatus 300 to carry out various functions in accordance with example embodiments of the present disclosure.

The processor 302 may be embodied in a number of different ways and may, for example, include one or more processing devices configured to perform independently. Additionally or alternatively, the processor may include one or more processors configured in tandem via a bus to enable independent execution of computer coded instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute computer coded instructions stored in the memory 304 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the computer coded instructions may specifically configure the processor to perform the algorithms and/or operations described herein when the computer coded instructions are executed.

In some embodiments, the apparatus 300 may include input/output circuitry 308 that may, in turn, be in communication with processor 302 to provide output to the user and, in some embodiments, to receive an indication of a user input. The input/output circuitry 308 may comprise a user interface and may include a display and may comprise a web user interface, a mobile application, a client device, a kiosk, or the like. In some embodiments, the input/output circuitry 308 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 306 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 306 may include, for example, a network interface for enabling communications with a wired or wireless communication network. For example, the communications circuitry 306 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication interface generation circuitry 310 is configured to provide a group-based communication system interface having an aggregate calendar event interface 312. The group-based communication interface generation circuitry 310 is configured to facilitate user interaction with a group-based communication system. The aggregate calendar event interface 312 is accessible and viewable to group-based communication members and comprises assembled renderings of calendar event data objects from a plurality of external calendar resources. In one example, the aggregate calendar event interface 312 provides a user of a client device a consolidated view of accepted calendar event data objects of high priority.

The applications 314 such as external calendar resource app 316 and validated external resource app 318 consumes or calls one or more APIs of the external calendar resources 102-106 and the validated external resources 130-134. The external calendar resource app 316 and validated external resource app 318 may be one or more applications that execute on the client device and interact with the external calendar resources 102-106 and the validated external resources 130-134. It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as computer implemented methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code instructions stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

Example Data Flows to Facilitate Prioritization Ranking

FIGS. 4, 5, 6, 7, and 8 illustrate various interactions between a client device, one or more external calendar resources, one or more validated external resources, a group-based communication server, and a group-based communication system data corpus stored to a group-based communication system data repository 114. The interactions serve to support creation of a prioritization ranking of external calendar event data objects, external work objects, and internal calendar event data objects.

Figure 4:
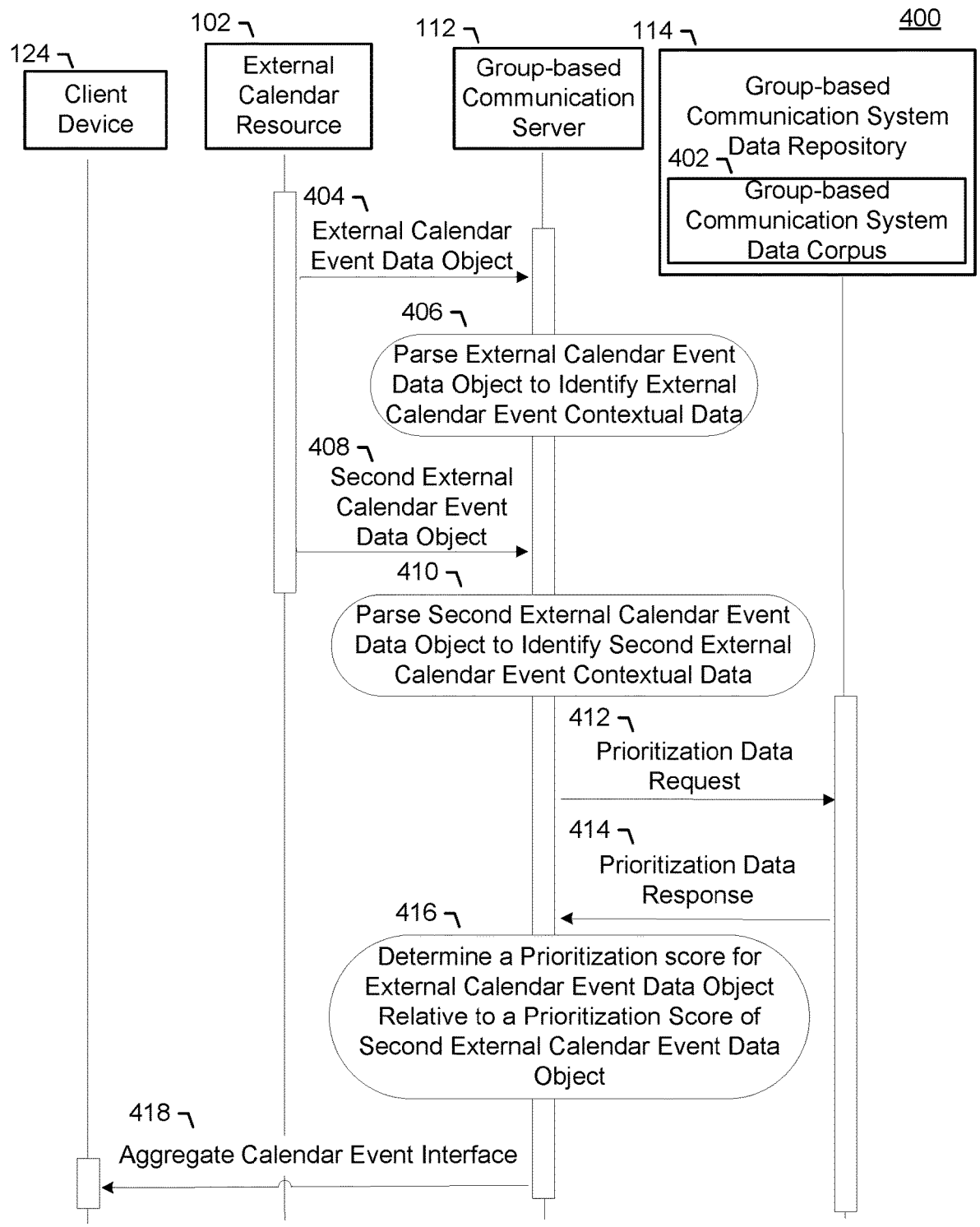
FIG. 4 illustrates an example operation sequence diagram in accordance with some embodiments discussed herein.

Referring now to FIG. 4, the process 400 illustrates example operations performed by a group-based communication server 112 for determining relative prioritization scores for two external calendar event data objects that are received from an external calendar resource 102. The process 400 starts at step 404, where the group-based communication server 112 receives an external calendar event data object from external calendar resource 102.

The external calendar resource 102 operates on a compiled code base or repository that is separate and distinct from that which supports the group-based communication system 110. In some embodiments, the external calendar resource 102 may communicate with the group-based communication server 112, and vice versa, through one or more APIs. In some embodiments, the external calendar resource 102 receives tokens or other authentication credentials (not shown) that are used to facilitate secure communication between the external calendar resource 102 and the group-based communication server 112 in view of group-based communication system network security layers or protocols (e.g., network firewall protocols). For purposes of illustration and not of limitation, consider an example in which the share API (perhaps through API handler circuitry) facilitates communications between the group-based communication server 112 and external calendar resource 102 for calendar event data objects and associated data.

In an example embodiment, to facilitate searching of the external calendar resource 102, a search engine of the group-based communication server 112 identifies the external calendar resource 102 by indexing the external calendar resource 102. The index of the external calendar resources 102 is stored in an external resource corpus of an external resource repository.

In another embodiment, the group-based communication server 112 is configured to subscribe to an API of the external calendar resource 102 to receive regular updates. Such updates are provided as external calendar event data objects, which may be provided immediately in response to some change (e.g., a calendar event is updated or created in the external calendar resource) or batched and provided at defined intervals (e.g., hourly, nightly, etc.).

Once the external calendar event data object is received by the group-based communication server 112, the external calendar event data object is analyzed by the group-based communication server 112 to determine the data received. The external calendar event data object may be normalized into a common or standardized format. In an example embodiment, the group-based communication sever 112 can standardize the external calendar event data object into a format recognizable and/or compatible with the group-based communication system.

After normalizing the external calendar event data object, the group-based communication server 112 parses the external calendar event data object to identify external calendar event contextual data as depicted by step 406. In one implementation, the external calendar event data object may be parsed using PHP commands to determine the external calendar event contextual data. For example, external calendar event contextual data may comprise: event title/subject information, topic information, event location information, event date and time information, event owner/organizer information, event attendee information and associated attendee responses, event type information (e.g., optional, required), event visibility (e.g., events on external calendar resource, events on group-based communication channels), alerts/reminders, event detail information that comprises text, images, audio, and file attachments, work objects attached to the event (e.g., a call, a file, a video, tasks, event, message, notification, email, another calendar event) or one or more predefined calendar data fields. The external calendar event contextual data may further include a user identifier, a device identifier, an external calendar resource identifier, one or more group identifiers for groups with which the user is associated, a message identifier, event identifier, or work object identifier. The group-based communication system may be configured to further facilitate indexing the external calendar event contextual data.

As shown in FIG. 4 by step 408, the group-based communication server 112 receives a second external calendar event data object from the external calendar resource 102. The second external calendar event data object is analyzed by the group-based communication server 112 to determine the data received. The second external calendar event data object is normalized into a common or standardized format. The group-based communication sever is then configured to parse the second external calendar event data object to identify a second external calendar event contextual data.

The group-based communication sever identifies common identifier data shared between the external calendar event contextual data and the second external calendar event contextual data. For example, common identifier data may comprise event organizer identifier and/or calendar event date and time. After identifying common identifier data, the group-based communication server transmits a prioritization data request 412 to the group-based communication system data repository 114. The prioritization data request comprises a query for application to a group-based communication system data corpus 402 to identify prioritization data based on the common identifier data shared between the external calendar event contextual data and the second external calendar event contextual data.

For example, the group-based communication server 112 may identify a user identifier for Janice Jones as a shared common identifier between the calendar event data object and the second calendar event data object. In this example, the shared common identifier suggests that Janice Jones is a requested attendee for two calendar events. The group-based communication server 112 uses the shared common identifier to query the group-based communication system data corpus 402 of the group-based communication system data repository 114 to identify group-based communication messaging data, group-based communication channel data, and group-based communication work object data associated with Janice Jones. This identified data may thus be used as prioritization data that is configured to train a prioritization suggestion model for determining prioritization scores for the calendar event data object and the second calendar event data object as discussed in greater detail below.

The group-based communication system data repository 114 is structured to facilitate analysis by the group-based communication server 112. For example, the group-based communication system data repository 114 may utilize tools such as Apache Hive, Presto, Apache Spark, and/or the like. The group-based communication system data repository comprises a group-based communication system data corpus 402 that comprises group-based communication messaging data, group-based communication channel data, and group-based communication work object data.

In one embodiment, the group-based communication server queries the group-based communication system data corpus 402 of the group-based communication system data repository 114 to retrieve prioritization data that comprises a digital record of a selected user's engagement of and interaction with the group-based communication system and reveals user associated insights concerning the calendar event contextual data. The available information sources in the group-based communication system data corpus may range from group-based communication messaging data, group-based communication channel data, and group-based communication work object data.

In another implementation, the prioritization data request may specify machine learning (ML) structure input data to obtain for ML structure(s) (e.g., work graph data) utilized for prioritization determination/priority ranking. For example, the group-based communication server 112 may provide the following example prioritization data request, substantially in the form of a HTTP(S) POST message including XML-formatted data, as provided below:

POST/prioritization_data_request.php HTTP/1.1
Host: www.server.com
Content-Type: Application/XML
Content-Length: 667
<?XML version="1.0" encoding="UTF-8"?>
<prioritization_data_request><request_identifier>ID_request 2</request_identifier>
<relevant_messages_to_get><access_control>data accessible to ID_team_1 (e.g., team of ID_user_2) <access_control><search_term>janedoe</search_term>
</relevant_messages_to_get>
<ML_structure_input_data_to_get>ID_ML_structure_input_1, ID_ML_structure_input_2, . . .
</ML_structure_input_data_to_get>
</ prioritization_data_request>

The group-based communication system data repository 114 may send a prioritization data response 414 to the group-based communication server 112 with prioritization data (e.g., group-based communication messaging data, group-based communication channel data, group-based communication work object data, etc.). Prioritization data is a compiled set of data and data structure associations that reveal user associated insights concerning a calendar event data object. The prioritization data may provide additional information to a machine learning module (e.g., part of the group-based communication circuitry) of the group-based communication server 112 about the subject of the calendar event, the other attendees, their group-based communication channel associations, etc., within the group-based communication system.

The prioritization data may be used to indicate a high priority sentiment across the group-based communication system data corpus. For example, the prioritization data may comprise the highest ranked group-based communication messages, files, users, channels, work objects and/or the like to the group-based communication server 112. In an example embodiment, the prioritization data response comprising prioritization data may be used to provide the highest ranked applicable data items to the calendar event data object. For example, prioritization data that include the highest ranked messages, channels, work object, and/or user information.

As shown in FIG. 4., the group-based communication server 112 may then, determine a prioritization score for the external calendar event data object relative to the prioritization score of the second external calendar event data object using a machine learning module for work graph/ machine learning processing which is described in more detail below with reference to FIG. 9.

Once the prioritization scoring process is complete for the external calendar event data object and the second external calendar event data object, the group-based communication server 112 is configured to transmit computer coded instructions for rendering an aggregate calendar event interface 418 comprising the external calendar event data object and/or the second external calendar event data object, wherein the aggregate calendar event interface is configured to display assembled renderings of the external calendar event data object and the second external calendar event data object from external calendar resource 102.

In some example embodiments, the group-based communication server 112 may be configured for receiving user acceptance input associated with the external calendar event data object or the second external calendar event data object via the aggregate calendar event interface of a group-based communication interface and transmit computer coded instructions for rendering the aggregate calendar event interface comprising the external calendar event data object or the second external calendar event data associated with the user acceptance input, wherein the aggregate calendar event interface is configured to display accepted calendar event data objects from a plurality of external calendar resources.

Figure 5:
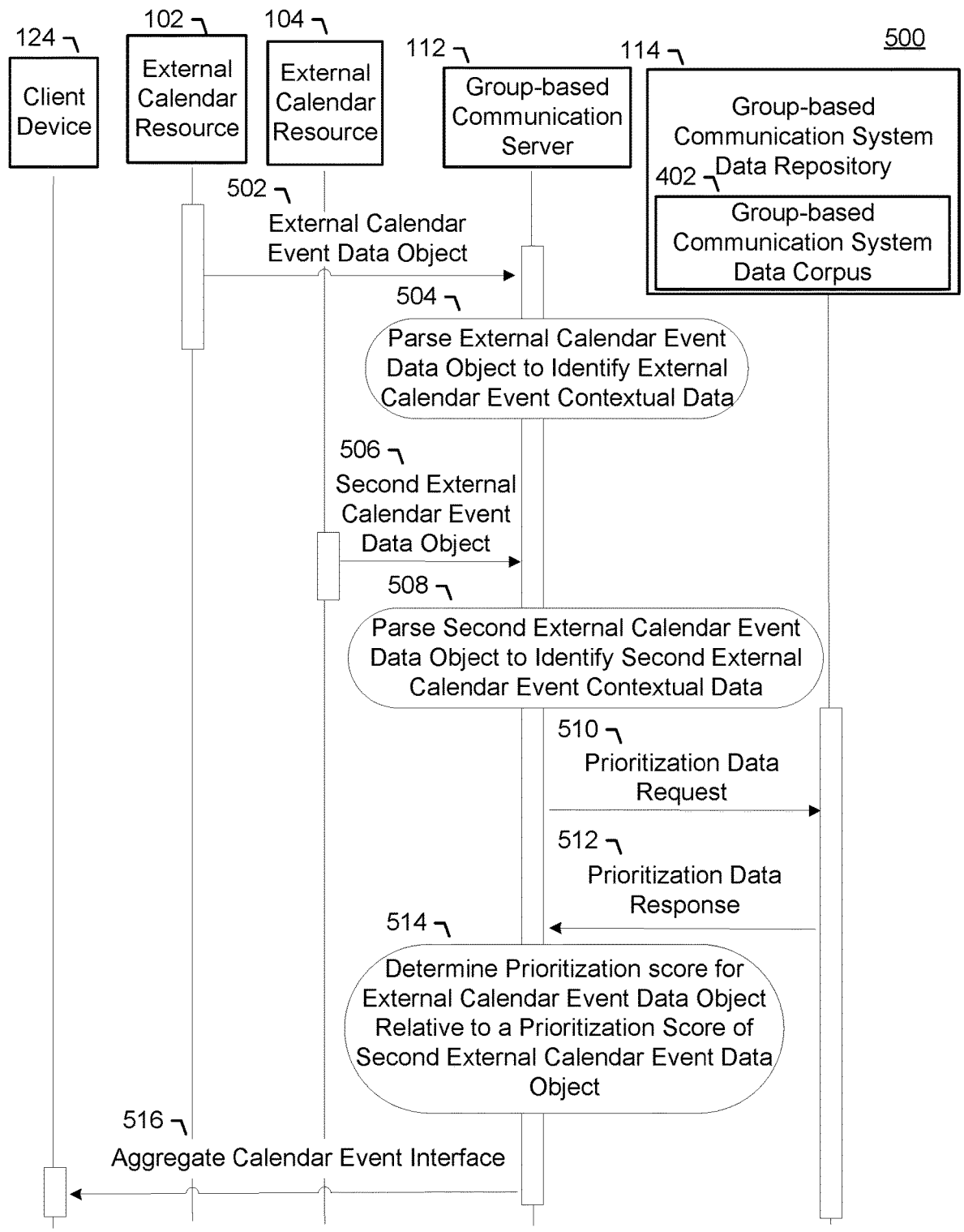
FIG. 5 illustrates an example operation sequence diagram in accordance with some embodiments discussed herein.

Referring now to FIG. 5, the process 500 illustrates example operations performed by a group-based communication server 112 for determining relative prioritization scores for two external calendar event data objects that are received from different external calendar resources: a first external calendar resource 102 and a second external calendar resource 104. The process 500 starts at step 502, where the group-based communication server 112 receives an external calendar event data object from the first external calendar resource 102. The external calendar event data object is analyzed by the group-based communication server 112 to determine the data received. The external calendar event data object is normalized into a common or standardized format. In an example embodiment, the group-based communication sever 112 can standardize the external calendar event data object into a format recognizable and/or compatible with the group-based communication system. After normalizing the external calendar event data object, the group-based communication server 112 parses the external calendar event data object to identify external calendar event contextual data as depicted by step 506.

As shown in FIG. 5 by step 506, the group-based communication server 112 receives a second external calendar event data object from a second external calendar resource 104. The first external calendar resource 102 is different from the second external calendar resource 104 (e.g., external calendar resource 102 is associated with iCal® application of Apple®, and external calendar resource 104 is associated with Microsoft® Office Outlook™ Calendar of Microsoft Corporation).

In an example embodiment, to facilitate searching of the first external calendar resource 102 and the second external calendar resource 104, a search engine of the group-based communication server 112 identifies the external calendar resources 102 and 104 by indexing the external calendar resources 102 and 104. The indexes of the external calendar resources 102 and 104 are stored in an external resource corpus of an external resource repository.

In another embodiment, the group-based communication server 112 is configured to subscribe to an API of the external calendar resource 102 and an API of the external calendar resource 104 to receive regular updates. Such updates are provided as external calendar event data objects, which may be provided immediately in response to some change (e.g., a calendar event is updated or created in the external calendar resource) or batched and provided at defined intervals (e.g., hourly, nightly, etc.).

Once the second external calendar event data object is received by the group-based communication server 112, the second external calendar event data object is analyzed by the group-based communication server 112 to determine the data received. The second external calendar event data object is normalized into a common or standardized format. In an example embodiment, the group-based communication sever 112 can standardize the second external calendar event data object into a format recognizable and/or compatible with the group-based communication system. For example, the external calendar event data object may include date and time information in the format 2019-01-30 13:39:21whereas the second calendar event data object may include date and time information the format Wed January 30 13:39:21 +0000 2019. The group-based communication server is configured to normalize these date and time information to a common date and time format such as, for example, Wednesday $30^{th}$ of January 2019 13:39:21 GMT. Therefore, in some embodiments, the group-based communication server 112 may "clean" or normalize the second external calendar event data object information, for example, to aid in the comparison of the second external calendar event data object to the external calendar event data object information.

The group-based communication sever is then configured to parse the normalized second external calendar event data object to identify a second external calendar event contextual data as depicted by step 508. For example, second external calendar event contextual data may comprise: event title/subject information, topic information, event location information, event date and time information, event owner/organizer information, event attendee information and associated attendee responses, event type information (e.g., optional, required), event visibility (e.g., events on external calendar resource, events on group-based communication channels), alerts/reminders, event detail information that comprises text, images, audio, and file attachments, work objects attached to the event (e.g., a call, a file, a video, tasks, event, message, notification, email, another calendar event) or one or more predefined calendar data fields. The external calendar event contextual data may further include a user identifier, a device identifier, an external calendar resource identifier, one or more group identifiers for groups with which the user is associated, a message identifier, event identifier, or work object identifier. The group-based communication system may be configured to further facilitate indexing the external calendar event contextual data.

The group-based communication sever identifies common identifier data shared between the external calendar event contextual data and the second external calendar event contextual data. For example, common identifier data may comprise event organizer identifier and/or calendar event date and time. After identifying common identifier data, the group-based communication sever will transmit a prioritization data request 510 to the group-based communication system data repository 114. The prioritization data request comprises a query for application to a group-based communication system data corpus 402 to identify prioritization data based on the common identifier data shared between the external calendar event contextual data and the second external calendar event contextual data.

For example, the group-based communication server 112 may identify a calendar event date and time as a shared common identifier between the external calendar event data object and the second external calendar event data object. In this example, the shared common identifier suggests that the user (recipient of the two external calendar event data objects) is a requested attendee for two calendar events occurring at the same date and time. The group-based communication server 112 uses the shared common identifier to query the group-based communication system data corpus 402 of the group-based communication system data repository 114 to identify group-based communication messaging data, group-based communication channel data, and group-based communication work object data associated with the user. This identified data may thus be used as prioritization data that is configured to train a prioritization suggestion model for determining prioritization scores for the external calendar event data object and the second external calendar event data object as discussed in greater detail below.

In an example embodiment, the group-based communication server is configured to retrieve a prioritization data response 512 from the group-based communication system data repository 114, wherein the prioritization data response comprises prioritization data that comprises a digital record of a selected user's engagement of and interaction with the group-based communication system and reveals user associated insights concerning the external calendar event contextual data and the second external calendar event contextual data. The available information sources in the group-based communication system data corpus may range from group-based communication messaging data, group-based communication channel data, and group-based communication work object data.

As shown in FIG. 5., the group-based communication server 112 may then determine a prioritization score for the external calendar event data object relative to the prioritization score of the second external calendar event data object 514 using a machine learning module (e.g., part of the group-based communication circuitry) for work graph/machine learning processing which is described in more detail below with reference to FIG. 9.

Once the prioritization scoring process is complete for the external calendar event data object and the second external calendar event data object, the group-based communication server 112 is configured to transmit computer coded instructions for rendering an aggregate calendar event interface 516 configured to display assembled renderings of the external calendar event data object and the second external calendar event data object from external calendar resource 102 and external calendar resource 104.

In some example embodiments, the group-based communication server 112 may be configured to receive user acceptance input associated with the external calendar event data object or the second external calendar event data object via the aggregate calendar event interface of a group-based communication interface and transmit computer coded instructions for rendering the aggregate calendar event interface comprising the external calendar event data object or the second external calendar event data associated with the user acceptance input, wherein the aggregate calendar event interface is configured to display accepted calendar event data objects from a plurality of external calendar resources.

Figure 6:
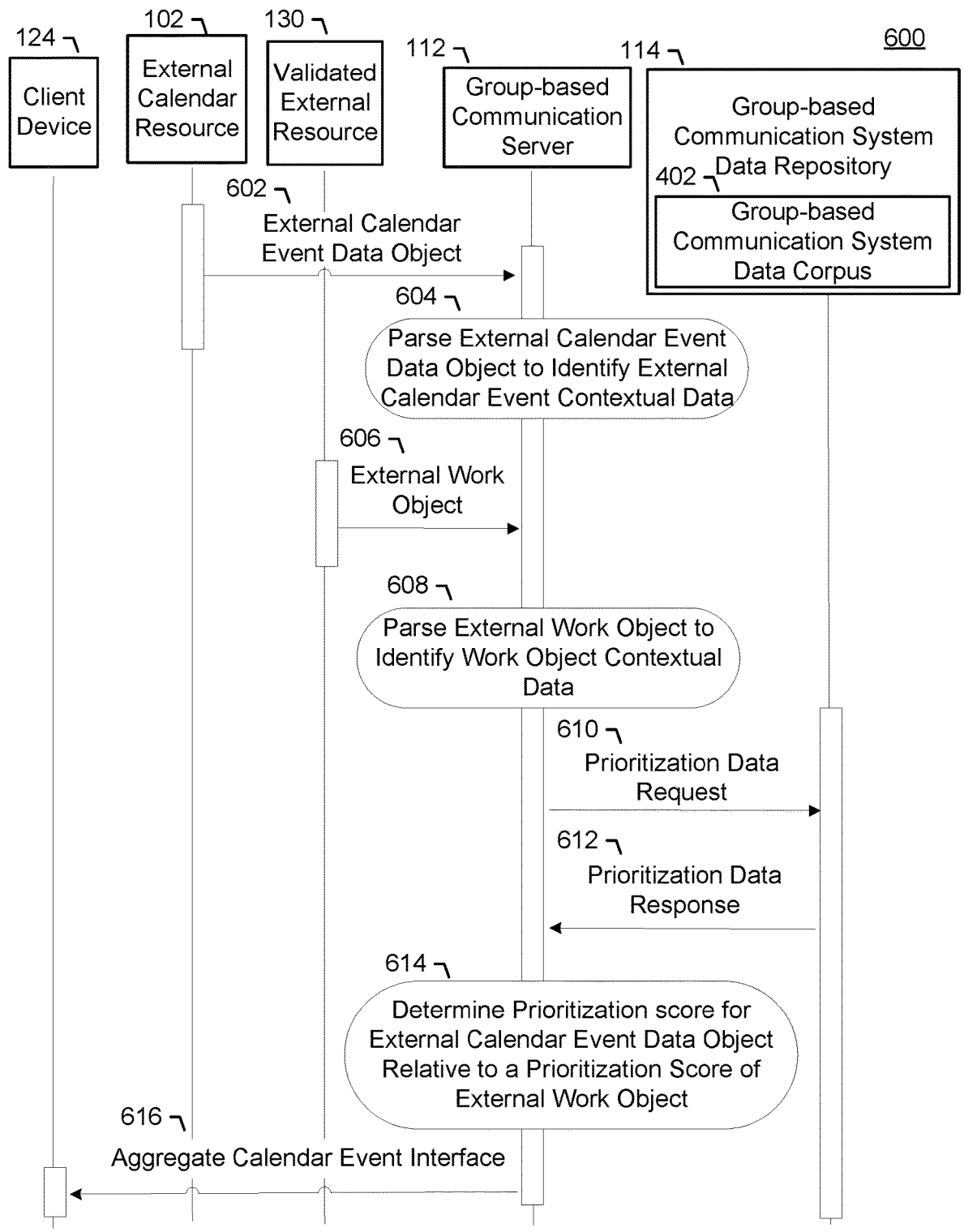
FIG. 6 illustrates an example operation sequence diagram in accordance with some embodiments discussed herein.

Referring now to FIG. 6, the process 600 illustrates an example process of calendar event prioritization ranking when an external calendar event data object is received from an external calendar resource 102. Further, the group-based communication sever 112 receives an external work object from validated external resource 130.

The process 600 starts at step 602, where the group-based communication server 112 receives an external calendar event data object from external calendar resource 102. The external calendar event data object is analyzed by the group-based communication server 112 to determine the data received. The external calendar event data object is normalized into a common or standardized format. In an example embodiment, the group-based communication sever 112 standardizes the external calendar event data object into a format recognizable and/or compatible with the group-based communication system. The group-based communication server 112 is then configured to parse the external calendar event data object to identify external calendar event contextual data as depicted by step 604.

As shown in FIG. 6 by step 606, the group-based communication server 112 receives an external work object from a validated external resource 130 (e.g., Jira issue ticket). The external calendar resource 102 is different from the validated external resource 130 (e.g., external calendar resource 102 is associated with iCal® application of Apple®, and validated external resource 130 is associated with Jira of Atlassian).

The validated external resource 130 operates on a compiled code base or repository that is separate and distinct from that which supports the group-based communication system 110. In some embodiments, the validated external resource 130 may communicate with the group-based communication server 112, and vice versa, through one or more APIs. In some embodiments, the validated external resource 130 receives tokens or other authentication credentials (not shown) that are used to facilitate secure communication between the validated external resource 130 and the group-based communication server 112 in view of group-based communication system network security layers or protocols (e.g., network firewall protocols). For purposes of illustration and not of limitation, consider an example in which the share API (perhaps through API handler circuitry) facilitates communications between the group-based communication server 112 and the validated external resource 130 for external work objects and associated data.

In an example embodiment, to facilitate searching of the validated external resource 130, a search engine of the group-based communication server 112 identifies the validated external resource 130 by indexing the validated external resource 130. The index of the validated external resource 130 is stored in an external resource corpus of an external resource repository.

In another embodiment, the group-based communication server 112 is configured to subscribe to an API of the validated external resource 130 to receive regular updates. Such updates are provided as external work objects, which may be provided immediately in response to some change (e.g., external work object is updated or created in the validated external resource) or batched and provided at defined intervals (e.g., hourly, nightly, etc.).

Once the external work object is received by the group-based communication sever 112, the external work object is analyzed by the group-based communication server 112 to determine the data received. The external work object is normalized into a common or standardized format. In an example embodiment, the group-based communication sever 112 normalizes the external work object into standard attributes (e.g., title/subject, date, content, etc.) compatible with the group-based communication system so as to facilitate heterogeneous searching. For example, the group-based communication server 112 may apply normalization rules comprising a rule to remove from the title/subject or content description value information unnecessary to describe the title/subject or content description, a rule to standardize the format of the user name value (e.g., last name first, then first name), a rule to remove social title from the user name value, a rule to add padding bits to a header, rule to add leading zeros before a first significant digit, and the like.

After normalizing the external work object into standard attributes, the group-based communication server is then configured to parse the external work object to identify work object contextual data as depicted by step 608. For example, work object contextual data may comprise: title/subject information, date and time information, work object owner/creator information, work object type information (e.g., file, email, call, image, ticket, task, etc.), work object detail information that comprises text, images, audio, and file attachments, objects attached to the event (e.g., audio, file, video, tasks) or one or more predefined work object data fields. The work object contextual data may further include a validated external resource identifier, a user identifier, or a device identifier.

The group-based communication server identifies common identifier data shared between the external calendar event contextual data and the work object contextual data. After identifying common identifier data, the group-based communication server will transmit a prioritization data request 610 to the group-based communication system data repository 114. The prioritization data request comprises a query for application to a group-based communication system data corpus 402 for identifying prioritization data based on the common identifier data shared between the external calendar event contextual data and the work object contextual data.

For example, the group-based communication server 112 may identify a user identifier for Janice Jones as a shared common identifier between the external calendar event data object and the external work object. In this example, the shared common identifier suggests that Janice Jones is a requested attendee for external calendar event and Janice Jones is also the owner of the external work object (e.g., JIRA ticket assignee). The group-based communication server 112 uses the shared common identifier to query the group-based communication system data corpus 402 of the group-based communication system data repository 114 to identify group-based communication messaging data, group-based communication channel data, and group-based communication work object data associated with Janice Jones. This identified data may thus be used as prioritization data that is configured to train a prioritization suggestion model for determining prioritization scores for the external calendar event data object and the external work object as discussed in greater detail below.

The group-based communication system data repository 114 may send a prioritization data response 612 to the group-based communication server 112 with prioritization data (e.g., group-based communication messaging data, group-based communication channel data, group-based communication work object data, etc.). Prioritization data is a compiled set of data and data structure associations that reveal user associated insights concerning an external calendar event data object and external work object. The prioritization data may provide additional information to a machine learning module (e.g., part of the group-based communication circuitry) of the group-based communication server 112 about the subject of the external calendar event, the external work object, the other attendees, their group-based communication channel associations, etc., within the group-based communication system.

The group-based communication server 112 may then determine a prioritization score for the external calendar event data object relative to a prioritization score of the work object 614 using a machine learning module for work graph/machine learning processing which is described in more detail below with reference to FIG. 9.

Once the prioritization scoring process is complete for the external calendar event data object and the external work object, the group-based communication server 112 is configured to transmit computer coded instructions for rendering of an aggregate calendar event interface 616 configured to display assembled renderings of the external calendar event data object from external calendar resource 102.

In some example embodiments, the group-based communication server 112 may be configured to receive user acceptance input associated with the external calendar event data object; and transmit instructions for rendering an aggregate calendar event interface comprising the external calendar event data object associated with the user acceptance input, wherein the aggregate calendar event interface is configured to display accepted calendar event data objects from a plurality of external calendar resources.

Figure 7:
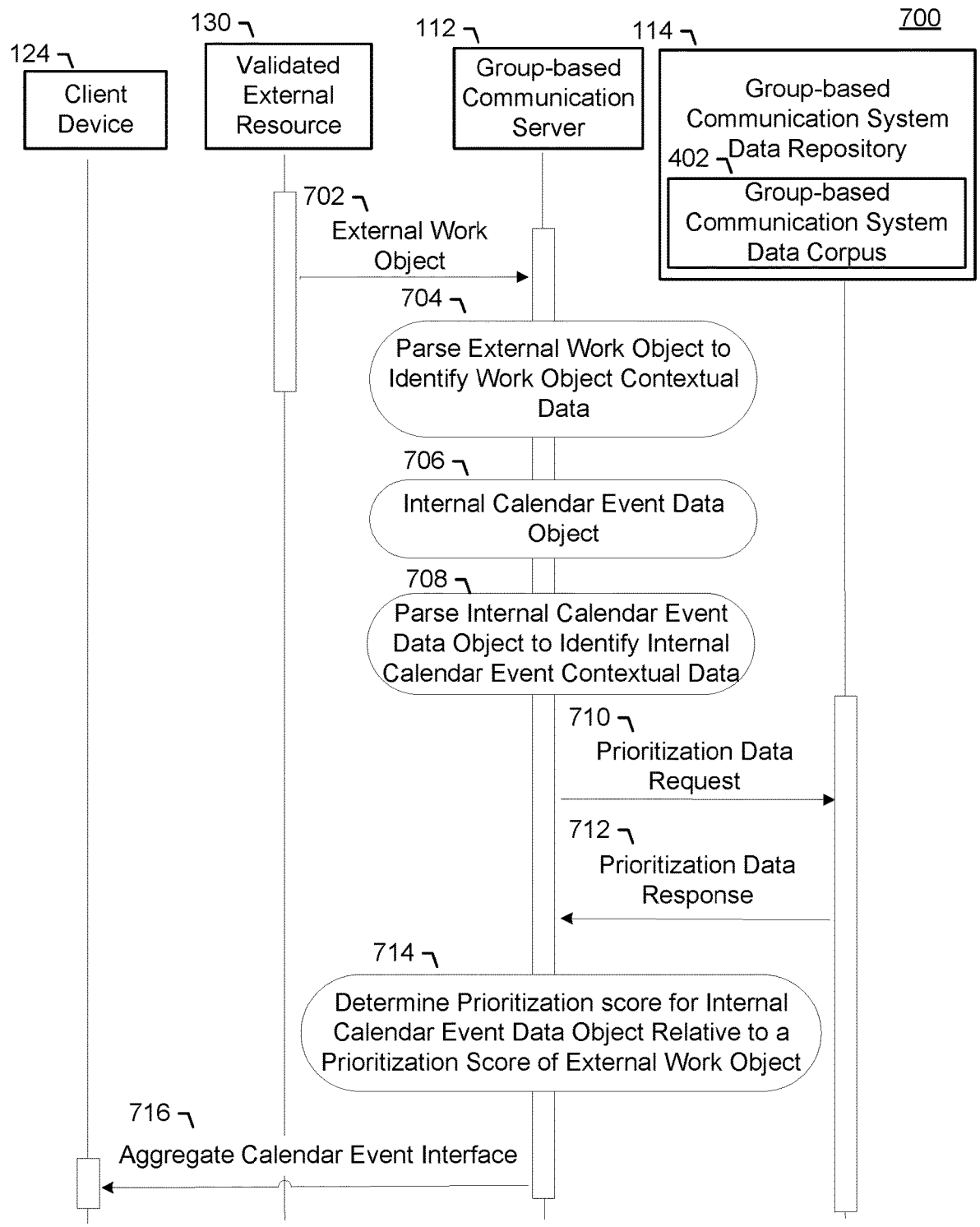
FIG. 7 illustrates an example operation sequence diagram in accordance with some embodiments discussed herein.

Referring now to FIG. 7, the process 700 illustrates an example process of calendar event prioritization ranking when an external work object is received from a validated external resource 130. Further, the group-based communication sever 112 creates an internal calendar event data object via the group-based communication interface.

The process 700 starts at step 702, where the group-based communication server 112 receives an external work object from validated external resource 130. Once the external work object is received by the group-based communication sever 112, the external work object is analyzed by the group-based communication server 112 to determine the data received. The external work object is normalized into a common or standardized format. In an example embodiment, the group-based communication sever 112 normalizes the external work object into standard attributes (e.g., title/subject, date, content, etc.) compatible with the group-based communication system so as to facilitate heterogeneous searching.

The group-based communication server 112 then parses the normalized external work object to identify work object contextual data as shown in step 704. The group-based communication server 112 is further configured to create an internal calendar event data object as depicted by step 706. In step 708, the group-based communication server is configured to parse the internal calendar event data object to identify internal calendar event contextual data.

The internal calendar event contextual data may comprise: event title/subject information, event location information, event date and time information, event owner/organizer information, event attendee information and associated attendee responses, event type information (e.g., optional, required), event visibility (e.g., events on external calendar resource, events on group-based communication channels), alerts/reminders, event detail information that comprises text, images, audio, and file attachments, objects attached to the event (e.g., a call, a file, a video, tasks) or one or more predefined calendar data fields. The internal calendar event contextual data may further include a user identifier, one or more group-based communication channel identifiers associated with group-based communication channels that the user has been granted access to, one or more group identifiers for groups with which the user is associated, message identifier, event identifier, or work object identifier. The group-based communication system may be configured to further facilitate indexing the internal calendar event contextual data.

After identifying work object contextual data and internal calendar event contextual data, the group-based communication server 112 is configured to identify common identifier data shared between the internal calendar event contextual data and the work object contextual data. For example, common identifier data may comprise event organizer identifier and/or calendar event date and time. After identifying common identifier data, the group-based communication sever will transmit a prioritization data request 710 to the group-based communication system data repository 114. The prioritization data request comprises a query for application to a group-based communication system data corpus 402 for identifying prioritization data based on the common identifier data shared between the internal calendar event contextual data and the work object contextual data.

For example, the group-based communication server 112 may identify a calendar event date and time as a shared common identifier between the internal calendar event data object and the external work object. In this example, the shared common identifier suggests that the user (recipient of the internal calendar event data and the external work object) is a requested attendee for the internal calendar event occurring at the same date of scheduled time off of the external work object (e.g., Workday® time off request). The group-based communication server 112 uses the shared common identifier to query the group-based communication system data corpus 402 of the group-based communication system data repository 114 to identify group-based communication messaging data, group-based communication channel data, and group-based communication work object data associated with the user. This identified data may thus be used as prioritization data that is configured to train a prioritization suggestion model for determining prioritization scores for the internal calendar event data object and the external work object as discussed in greater detail below.

In one embodiment, the group-based communication system data repository 114 may send a prioritization data response 712 to the group-based communication server 112 with prioritization data (e.g., group-based communication messaging data, group-based communication channel data, group-based communication work object data, etc.). Prioritization data is a compiled set of data and data structure associations that reveal user associated insights concerning the internal calendar event data object and the external work object. The prioritization data may provide additional information to a machine learning module (e.g., part of the group-based communication circuitry) of the group-based communication server 112 about the subject of the internal calendar event, the other attendees, their group-based communication channel associations, the subject of the work object, their group-based communication channel associations, etc., within the group-based communication system.

The group-based communication server 112 may then, determine a prioritization score for the internal calendar event data object relative to a prioritization score of the external work object 714 using a machine learning module for work graph/machine learning processing which is described in more detail below with reference to FIG. 9.

Once the prioritization scoring process is complete for the internal calendar event data object, the group-based communication server 112 is configured to transmit computer coded instructions for rendering an aggregate calendar event interface 716 configured to display assembled renderings of the internal calendar event data object given the external work object received from the validated external resource 130.

In another example embodiment, the group-based communication server is configured to generate a second internal calendar event data object comprising data related to the external work object (e.g., subject, date and time of Workday® time off request), and transmit computer coded instructions for rendering an aggregate calendar event interface configured to display assembled renderings of the internal calendar event data object and the second internal calendar event data object related or associated with the external work object received from the validated external resource 130.

In some example embodiments, the group-based communication server 112 may be configured to receive user acceptance input associated with the internal calendar event data object; and transmit instructions for rendering an aggregate calendar event interface comprising the internal calendar event data object associated with the user acceptance input, wherein the aggregate calendar event interface is configured to display accepted calendar event data objects from a plurality of external calendar resources.

Figure 8:
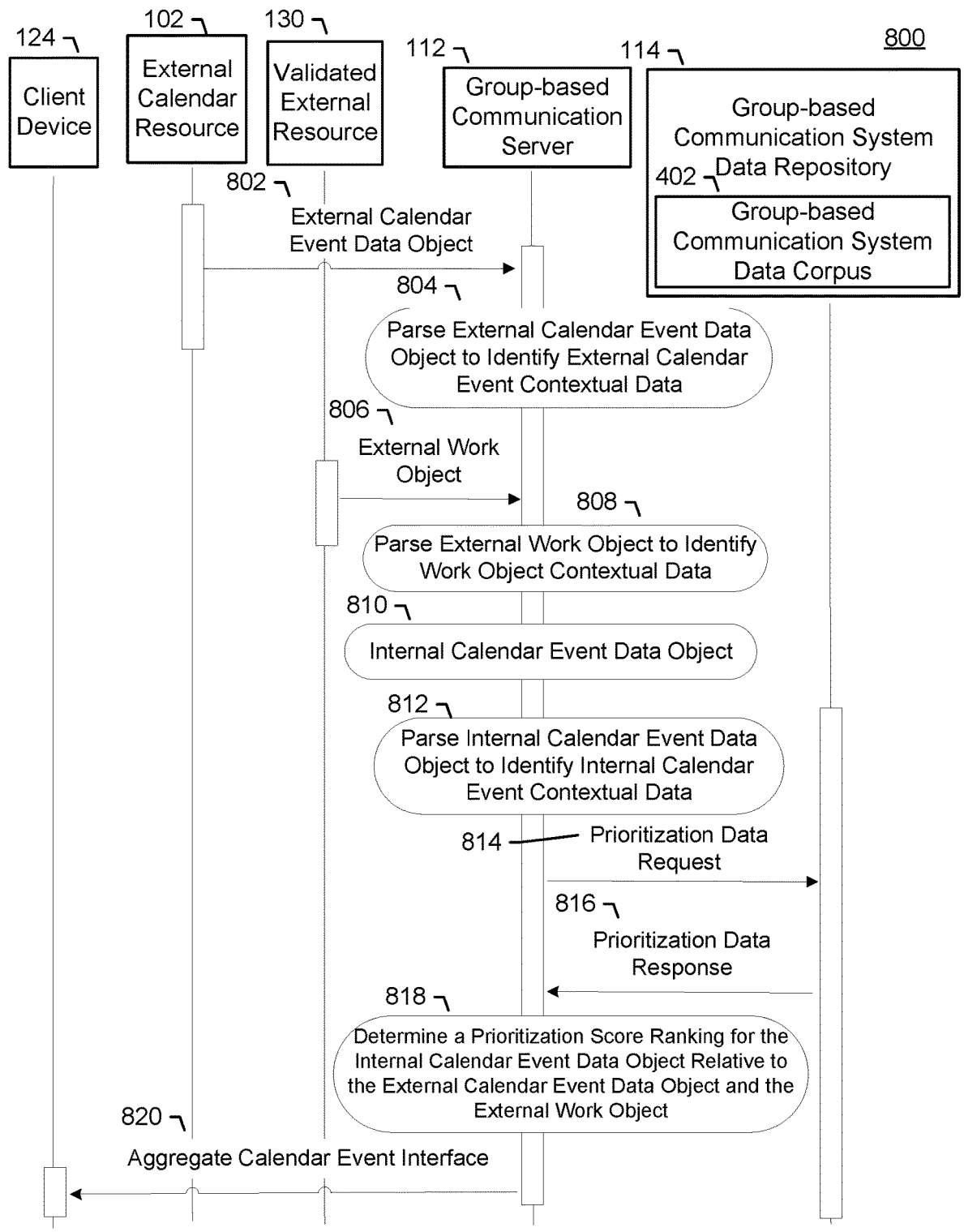
FIG. 8 illustrates an example operation sequence diagram in accordance with some embodiments discussed herein.

Referring now to FIG. 8, the process 800 illustrates an example process of calendar event prioritization ranking when an external calendar event data object is received from an external calendar resource 102. Further, the group-based communication sever 112 receives an external work object from validated external resource 130 and the group-based communication sever is configured to create an internal calendar event data object.

In an example embodiment, to facilitate searching of the external calendar resource 102 and the validated external resource 130, a search engine of the group-based communication server 112 identifies the external calendar resource 102 and the validated external resource 130 by indexing the external calendar resource 102 and the validated external resource 130. The respective indexes of the external calendar resource 102 and the validated external resource 130 are stored in an external resource corpus of an external resource repository.

In another embodiment, the group-based communication server 112 is configured to subscribe to an API of the external calendar resource 102 and an API of the validated external resource 130 to receive regular updates. Such updates are provided as external calendar event data objects or external work objects, which may be provided immediately in response to some change (e.g., a calendar event is updated or created in the external calendar resource; a ticket or task associated with an external work object is updated or created in the validated external resource) or batched and provided at defined intervals (e.g., hourly, nightly, etc.).

The process 800 starts at step 802, where the group-based communication server 112 receives an external calendar event data object from external calendar resource 102. The external calendar event data object is analyzed by the group-based communication server 112 to determine the data received. The external calendar event data object is normalized into a common or standardized format. In an example embodiment, the group-based communication sever 112 can standardize the first calendar event data object into a format recognizable and/or compatible with the group-based communication system. The group-based communication server 112 is then configured to parse the external calendar event data object to identify external calendar event contextual data as depicted by step 804.

In step 806, the group-based communication server 112 receives an external work object from a validated external resource 130 (e.g., Workday® time off request ticket). The external calendar resource 102 is different from the validated external resource 130 (e.g., external calendar resource 102 is associated with iCal® application of Apple®, and validated external resource 130 is associated with Workday® of Workday Inc.). The external work object is analyzed by the group-based communication server 112 to determine the data received. The external work object is normalized into a common or standardized format. Once, the external work object is normalized, the group-based communication sever is then configured to parse the external work object to identify work object contextual data as depicted by step 808.

In step 810, the group-based communication sever is configured to create an internal calendar event data object. The group-based communication server is further configured to parse the internal calendar event data object to identify internal calendar event contextual data.

The group-based communication sever 112 then identifies common identifier data shared between the external calendar event contextual data, the internal calendar event data object, and the work object contextual data. After identifying common identifier data, the group-based communication sever will transmit a prioritization data request 812 to the group-based communication system data corpus 402. The prioritization data request comprises a query to identify prioritization data based on the common identifier data shared between the external calendar event contextual data, the internal calendar event data object, and the work object contextual data.

For example, the group-based communication server 112 may identify a calendar event date and time as a shared common identifier between the internal calendar event data object, the external calendar event data object, and the external work object. In this example, the shared common identifier suggests that the user (recipient of the internal calendar event data, the external calendar event data object, and the external work object) is a requested attendee for the internal calendar event and external calendar event all occurring at the same date of scheduled time off of the external work object (e.g., Workday® time off request). The group-based communication server 112 uses the shared common identifier to query the group-based communication system data corpus 402 of the group-based communication system data repository 114 to identify group-based communication messaging data, group-based communication channel data, and group-based communication work object data associated with the user. This identified data may thus be used as prioritization data that is configured to train a prioritization suggestion model for determining prioritization scores for the internal calendar event data object, the external calendar event data object, and the external work object as discussed in greater detail below.

The group-based communication system data repository 114 is configured to send a prioritization data response 816 to the group-based communication server 112 with prioritization data (e.g., group-based communication messaging data, group-based communication channel data, group-based communication work object data, etc.). Prioritization data is a compiled set of data and data structure associations that reveal user associated insights concerning the internal calendar event data object, the external calendar event data object, and the external work object. The prioritization data may provide additional information to a machine learning module (e.g., part of the group-based communication circuitry) of the group-based communication server 112 about the subject of the calendar events (internal and external), the other attendees, their group-based communication channel associations, the urgency of the work day object, etc., within the group-based communication system..

The group-based communication server 112 may then determine a prioritization ranking for the internal calendar event data object relative to the external calendar event data object and the external work object 818 using a machine learning module for work graph/machine learning processing which is described in more detail below with reference to FIG. 9.

Once the prioritization scoring process is complete for the external calendar event data object and the internal calendar event data object, the group-based communication server 112 is configured to transmit computer coded instructions for rendering an aggregate calendar event interface 820 configured to display assembled renderings of the internal calendar event data object and the external calendar event data object from external calendar resource 102.

In some example embodiments, the group-based communication server 112 may be configured to receive user acceptance input associated with the internal calendar event data object or the external calendar event data object; and transmit instructions for rendering an aggregate calendar event interface comprising the internal calendar event data object or the external calendar event data object associated with the user acceptance input, wherein the aggregate calendar event interface is configured to display accepted calendar event data objects from a plurality of external calendar resources.

Group-based Communication Corpus and Work Graphs

In some embodiments, a group-based communication system data repository 114 is provided that comprises a group-based communication system data corpus 402. The group-based communication system data corpus 402 comprises group-based communication messaging data, group-based communication channel data, and group-based communication work object data. As discussed herein, the group-based communication system data corpus 402 is associated with the group-based communication system 110.

Group-based communication messaging data, in some embodiments, may include digital content objects provided by a user using a client device and that is configured for display within a group-based communication channel. Group-based communication messaging data may include any text, image, video, audio, or combination thereof provided by user (using a client device). Each message transmitted or posted to a group-based communication channel of the group-based communication system comprises metadata comprising the following: a user identifier (defined below), a message identifier, message contents, a group identifier, and a group-based communication channel identifier. The group-based communication sever 112 is configured to determine semantic importance of one or more keywords or text phrases found in the group-based messaging data associated with the user identifier. Other text analytic techniques may be applied to rank keywords and/or text phrases and determine most important text phrases. Once the important keywords and/or text phrases are identified, conceptually related group-based communication messaging data matching the important keywords and/or text phrases may be retrieved from the group-based communication system data corpus 402.

Group-based communication channel data, in some embodiments, may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel. Group-based communication channel data may include membership information (i.e. whether a user is a member of a specific group-based communication channel), starring information (i.e. whether a user has starred or indicated a preference for a specific group-based communication channel), a level of activity (i.e. the frequency with which a user reads and/or posts messages in specific group-based communication channels), information regarding a level of activity of a user in a group-based communication channel as determined by the number of posted messages, the number of times that a user reads messages, the number of times a user accesses a group-based communication channel, channel word count data (e.g., the number of times a user has mentioned certain words in messages posted in group-based communication channels), information regarding how recently a user has accessed a specific group-based communication channel, information regarding the rate at which users access a specific group-based communication channel, information regarding the rate at which users read messages posted in a particular group-based communication channel, information that quantifies the number of times users post messages in group-based communication channels, and/or the like.

An example approach to channel use frequency, channel access recency, etc., is disclosed in commonly owned U.S. patent application Ser. No. 15/958,484 titled "METHOD, APPARATUS, AND COMPUTER PROGRAM PRODUCT FOR OUTPUTTING IMPROVED AUTOSUGGESTIONS IN A GROUP-BASED COMMUNICATION SYSTEM," filed Apr. 20, 2018,the contents of which are incorporated herein by reference in their entity. Other variations of the user-channel access frequency data are also contemplated by this disclosure and definition as will be apparent to one of ordinary skill in the art.

Group-based communication work object data, in some embodiments, may include data extracted or derived from an external work object or an internal work object. Group-based communication work data may include title/subject information, date and time information, work object owner/creator information, work object type information (e.g., file, email, call, image, ticket, task, etc.), work object detail information that comprises text, images, audio, and file attachments, objects attached to the event (e.g., audio, file, video, tasks) or one or more predefined work object data fields, a validated external resource identifier, a user identifier, one or more group-based communication channel identifiers associated with group-based communication channels that the user has been granted access to, one or more group identifiers for groups with which the user is associated, message identifier, event identifier, work object identifier, a level of activity (i.e. the frequency with which a user accesses a particular work object), information regarding how recently a user has accessed a particular work object, information regarding the rate at which users access a particular work object, and/or the like.

A topic work graph data structure may be generated that comprises, for each user, data regarding the calculated prioritization weight estimate of a topic (e.g., each topic discussed by the user, user's team, each topic discussed at the company the user is associated with) that is drawn from group-based communication messaging data, group-based communication channel data, and group-based communication work object data.

A user work graph data structure may be generated that comprises, for each user, data regarding the calculated prioritization weight estimate of a user's associations to other users that is drawn from group-based communication messaging data, group-based communication channel data, and group-based communication work object data.

A channel work graph data structure may be generated that comprises, for each user, data regarding the calculated prioritization weight estimate of a user's associations to group-based communication channels that is drawn from group-based communication messaging data, group-based communication channel data, and group-based communication work object data.

Prioritization Scoring

In an example embodiment, the group-based communication server 112 is configured to analyze calendar prioritization strategies from the existing user population which most-nearly matches one or more characteristics of the user associated with the received internal or external calendar event data object or from a default prioritization strategy. For example, an initial prioritization suggestion model learned for project ABC team members may be more appropriate for project ABC team members than a prioritization suggestion model appropriate for all project members. In certain embodiments, the group-based communication server 112 may use an initial prioritization model/strategy which provides pre-defined prioritization weight estimates usable for determining a prioritization score. The group-based communication server 112 is configured to continuously update one or more stored prioritization suggestion models, and accordingly the group-based communication server 112 may be configured to receive feedback data from the user using the one or more client devices 124-128, and to use such feedback as input to the prioritization suggestion models.

In one embodiment, the group-based communication server 112 transmits a prioritization data request comprising a query for application to a group-based communication system data corpus 402 to identify prioritization data based on the common identifier data shared between the external calendar event contextual data, the second external calendar event contextual data, the internal calendar event contextual data, and work object contextual data. The external calendar event contextual data is associated with an external calendar resource different from the external calendar resource associated with the second external calendar event contextual data.

For example, the group-based communication server 112 may identify a user identifier for Bobby Brooks as a shared common identifier between the external calendar event contextual data, the second external calendar event contextual data, the internal calendar event contextual data, and work object contextual data. In this example, the shared common identifier suggests that Bobby Brooks is a requested attendee for the external calendar event contextual data, the second external calendar event contextual data, and the internal calendar event contextual data. The shared common identifier further suggests that Bobby Brooks is the assignee of a JIRA production issue ticket. The group-based communication server 112 uses the shared common identifier to query the group-based communication system data corpus 402 of the group-based communication system data repository 114 to identify group-based communication messaging data, group-based communication channel data, and group-based communication work object data associated with Bobby Brooks. In this way, the group-based communication server 112 obtains message communications, channel information, and work object information to which Bobby Brooks is associated with, a member of, an assignee of, and/or an owner of This identified data may thus be used as prioritization data that is configured to train a prioritization suggestion model for determining prioritization scores for the external calendar event data object, the second external calendar event data object, the internal calendar event data object, and the external work object.

The group-based communication server 112 may be further configured to analyze the prioritization data. Prioritization data is a compiled set of data and data structure associations that reveal user associated insights concerning a calendar event data object or an external work object. The group-based communication server 112 may support multiple algorithms and methodologies, including those discussed below with respect to determining a prioritization score of and internal or external calendar event data object based, at least in part, on the data from the group-based communication system data corpus 402.

The group-based communication server 112 may receive prioritization data as discussed above and may generate an appropriate prioritization score. The group-based communication server 112 may use any of the algorithms, operations, steps, and processes disclosed herein for receiving prioritization data, and generating the appropriate prioritization score to encourage acceptance of high priority calendar events. The prioritization data may give context to the user's group-based communication environment to determine the group-based communication environment and user current state.

In an example embodiment, the group-based communication server 112 is configured to determine read, write, and/or access timestamps of group-based communication messaging data, group-based communication channel data, and group-based communication work object data associated with Bobby Brooks. The group-based communication server 112 may include data within a defined time period (e.g., the week, the last month, etc.) or within defined session(s) in determining prioritization scores for the external calendar event data object, the second external calendar event data object, the internal calendar event data object, and the external work object.

In another example embodiment, the group-based communication server 112 may access a user identifier database of the group-based communication system data repository 114 to determine one or more user interest relationship indicators from user profile data. Such user interest relationship indicators may include a user status indicator, a user job indicator and the like. The group-based communication server 112 may further access the user identifier database to determine social relationships and/or organization hierarchy relationships data defining relationships or associations with any number of users, entities and/or objects. For example, Bobby Brooks is a member of the artificial intelligence and mobile teams. Group-based communication server 112 may score calendar event data objects (internal and/or external) and external work objects higher that include the terms or topics "AI", "mobile", "Alexa", and other related terms. For example, an external work object comprising "Error during integration testing Alexa" would determine a higher prioritization score than an external calendar event data object comprising "Security Roadshow: Lunch and Learn."

In another example embodiment, group-based communication server 112 may use the user's job and the calendar event organizer's job in order to determine the prioritization score of the external calendar event data object. For example, an external calendar event data object from a user's supervisor may determine a higher prioritization score than an internal calendar event data object from someone on the same organization level as the user.

In yet another example embodiment, group-based communication server 112 considers one or more user validated external resource or external calendar resource interaction relationship indicators when determining a prioritization score. For example, Bobby Brooks may frequently access files via Workday® of Workday Inc. Each time Bobby Brooks accesses an external work object associated with Workday®, via group-based communication system 110, a client device, indicates this action (e.g., as an access event log, etc.) to group-based communication server 112. Group-based communication server 112 may then store, in the user's profile, a user external resource interaction relationship indicator that indicates Bobby Brooks access history for a particular external work object stored in Workday® or, more generally, for the Workday® service itself. Based on this information, group-based communication server 112 may determine a lower prioritization score for an external work object that is associated with Dropbox® of Dropbox Inc. This is because, according to stored user external resource interaction relationship indicators, Bobby Brooks is more likely, in his daily actions, to check Workday® and correspondingly less likely to check Dropbox®.

FIG. 9 shows an exemplary flowchart that embodies a computer implemented method 900 for determining prioritization scores of calendar event data objects. Computer implemented method 900 begins with step 902, where the group-based communication server 112 generates a prioritization weight estimate for the prioritization data using a prioritization suggestion model, wherein the prioritization weight estimate comprises a plurality of topic-related weights, for the prioritization data corresponding to a topic work graph determined from the group-based communication system data corpus.

The group-based communication server 112 may generate the prioritization weight estimate using data analytics and machine learning. In some example embodiments, the group-based communication server 112 determines the prioritization score via one or more machine learning algorithms. The group-based communication server 112 may provide a plurality of algorithms, which may utilize a generative approach, a discriminative approach, and/or other approaches for providing training data with pre-defined prioritization weight estimates to a machine learning algorithm. For example, in a generative approach, the training data may consist only of examples for confirmed prioritization scores and the machine learning model learns to predict the prioritization scores of similar calendar event data objects and external work objects in a given group-based communication environment. As an example of a generative approach, training data consists of both confirmed and unconfirmed prioritization scores and the priority suggestion model learns from both the confirmed and unconfirmed examples. With the group-based communication server 112 configured to provide prioritization suggestion models for determining a prioritization score of internal or external calendar event data objects and external work objects, various machine learning techniques may be utilized to train the prioritization suggestion model.

In an example embodiment, the group-based communication server 112 is configured to create a work graph from a prioritization suggestion model, wherein the work graph comprises attributes of work graph data represented as nodes while associations between such attributes are represented as edges. In an example embodiment, the prioritization suggestion model provides for relational clustering that seeks to identify cluster structures for each work object, internal calendar event data object, or external calendar event data object based on a work graph. Work graph data may be used as machine learning structure inputs for training and/or utilizing the prioritization suggestion model. A work graph shows strengths of relationships between users, channels, and topics that may facilitate ranking in a variety of applications. In one example embodiment, the group-based communication server 112 may generate the prioritization suggestion model to assign prioritization scores for a given user, message, channel, topic, and/or work object at a given time. In one embodiment, the strength of relationship among users, channels, topics, and work objects may be measured by interaction or engagement. In other words, a topic may be considered important or a high priority if the user is highly engaged with the topic or frequently accesses a channel or work object.

When prioritization data is received from the group-based communication system data repository 114 to the group-based communication server 112, for each data element, data topic, user identifier, channel identifier, group identifier, message identifier, event identifier, and work object identifier of the prioritization data, a prioritization weight estimate is generated by the group-based communication server 112. Based on the generated prioritization weight estimate, the internal calendar event contextual data, the external calendar event contextual data, and/or the external work object contextual data, the group-based communication server 112 determines a prioritization score for each of the external calendar event data object, the internal calendar event data object, and the external work object. In an example embodiment, the prioritization score for the calendar event data object is used by the group-based communication server 112 for comparison with a threshold to determine prioritization levels such as "low", "medium" or "high." For example, if the prioritization data value associated with the calendar event data object is below 50, or in a "low" range, the calendar event data object is assigned a "low" prioritization score. If the prioritization data value associated with the calendar event data object is above 75, or in a "high" range, the calendar event data object is assigned a "high" prioritization score.

In an example embodiment, the group-based communication sever 112 performs group-based communication system data repository 114 lookup operations to obtain a plurality of topic-realted weights, a plurality of user-related weights, and a plurality of channel-related weights that have been determined to meet predefined prioritization criteria or levels. In some example embodiments, each data element, data topic, user identifier, channel identifier, group identifier, message identifier, event identifier, and work object identifier of the prioritization data generates a greater prioritization weight estimate based on user-channel access frequency data. In one embodiment, the user-channel access frequency data comprises user-channel read frequency data. In a different variation of this embodiment, the user-channel access frequency data comprises user-channel write frequency data. In another example embodiment, the user-channel access frequency data is determined based on a channel work graph.

In another example embodiment, a greater prioritization weight estimate is based on user-resource access frequency data. In one embodiment, the user-resource access frequency data comprises user-resource read frequency data. In a different variation of this embodiment, the user-resource access frequency data comprises user-resource write frequency data. In another example embodiment, the user-resource access frequency data is determined based on a user work graph.

In another example embodiment, a greater prioritization weight estimate is based on channel word count data or word usage (i.e. the frequency with which a user mentions specific words, topics, other users, channels, work objects, and the like in a group-based communication channel) determined from a topic work graph.

In another example embodiment, a greater prioritization weight estimate is based on user-calendar action data. In one embodiment, the user-calendar action data comprises user-calendar action accept frequency data determined from a user work graph. For example, the group-based communication server may find that a user is likely to accept a calendar event invitation within a predetermined period of time from calendar event organizer named "Noelle Kelly," and an associated calendar event data object is given an commensurate weight. In other words, a prioritization weight estimate is generated that is commensurate with its predictive power, e.g., for predicting the likelihood that the calendar event data object will be accepted and therefore positioned in the user's calendar within a predetermined period of time after the calendar event data object is received by the group-based communication sever 112.

In another example embodiment, a greater prioritization weight estimate is based on organization hierarchy/social relationships determined by a user work graph. The graph is configured to provide relationship weights based on the interaction between the user and another user in the user's organization or social network, or the hierarchical level of the user compared to another user in the user's organization or social network. For example, the group-based communication server may find that a user is likely to accept a calendar event invitation within a predetermined period of time from the user's manager and an associated calendar event data object is given an commensurate weight.

In yet another example embodiment, the group-based communication server is configured to track engagement types comprising: clicks, reactions, replies, file clicks, external clicks, mentions, shares, starts, implicit replies, pins, reads, or selections. This information may be used to calculate a prioritization weight estimate of the topic to the user. In other words, the prioritization weight estimate may comprise a plurality of topic-related weights, a plurality of user-related weights, and a plurality of channel-related weights, for the prioritization data corresponding to an associated topic work graph, user work graph, or channel work graph determined by the group-based communication system data corpus. For example, a weighted average of user to user data may be calculated for each of the other users from the perspective of the user, and the resulting scores normalized so that each of the other users is assigned a user priority score (e.g., in the 0 to 1 range) from the perspective of the user. In another example, a machine learning technique (e.g., a neural network) may be used to calculate a user priority score for each of the other users from the perspective of the user.

As shown in step 904, the group-based communication server 112 is then configured to determine the prioritization score for the calendar event data object relative to the prioritization score of the second calendar event data object based on the generated prioritization weight estimate as described above, the calendar event contextual data, the another calendar event contextual data, and the prioritization data. For example, a channel priority score of external calendar event contextual data (e.g., calendar subject "Project ABC" is higher than channel priority score of the second external calendar event contextual data subject "Training: Agile 101, Introduction" from the perspective of prioritization data indicating that the user is a member of Project ABC and that eh user has accessed one or more message communications in the Project ABC team channel 100 times in the last 7 days.

In yet another example embodiment, a prioritization score of an external work object related to scheduled time off in Workday® may be higher relative to a prioritization score of the external calendar event data object related to a lunch networking event based on prioritization data indicating that the attendees of the lunch networking event do not have strong user-related weights based on the minimum interaction (e.g., direct messages) between the user and the attendees in the group-based communication system as evidence by group-based communication messaging data, group-based communication channel data, and group-based communication work object data.

In another example embodiment, the group-based communication server 112 is configured for receiving feedback data, via a group-based communication interface of the group-based communication system, regarding the prioritization score for the calendar event data object and may modify the prioritization suggestion model using the feedback data as shown in step 906. This scoring criteria may be combined with any others discussed above to determine a prioritization score.

The group-based communication server 112 is then configured to generate an aggregate calendar event interface comprising the prioritization score ranking for one or more external calendar event data object, one or more internal calendar event data object, and/or one or more external work objects. In one embodiment, the one or more external calendar event data object, one or more internal calendar event data object, and/or one or more external work objects are grouped and presented in the aggregate calendar event interface of the group-based communication interface according to their respective prioritization scores.

Examples of content ranking for use with embodiments of the present disclosure are disclosed in U.S. patent application Ser. No. 15/853,376titled "SYSTEM, APPARATUS, AND COMPUTER PROGRAM PRODUCT FOR GENERATING A GROUP-BASED COMMUNICATION INTERFACE HAVING IMPROVED PANES POSITIONED IN A DEFINED DISPLAY WINDOW," filed Dec. 22, 2017, the contents of which are incorporated herein by reference in their entirety.

Dynamic UI

Figure 10:
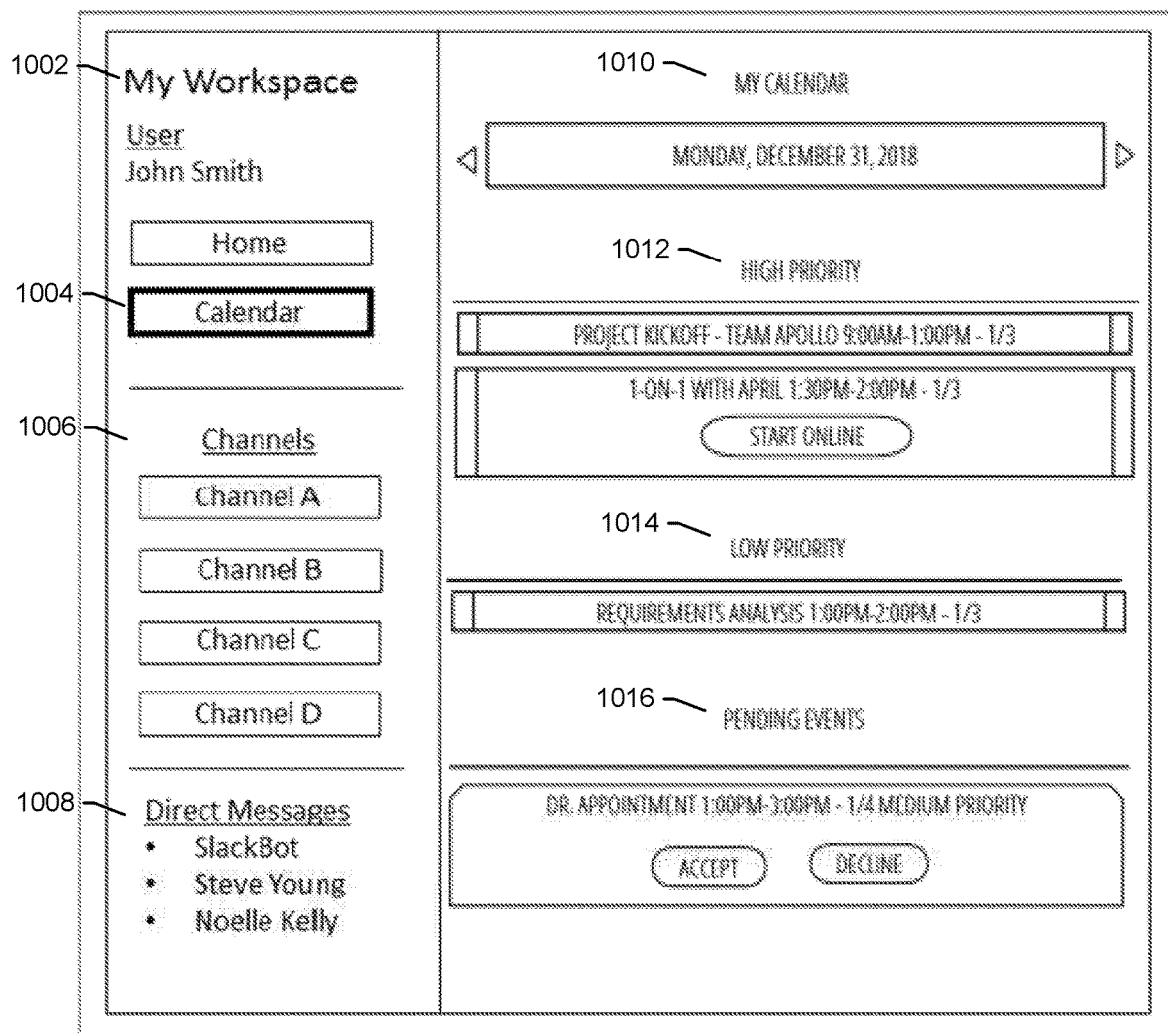
FIG. 10 illustrates an example aggregate calendar event interface of a group-based communication interface structured in accordance with some embodiments discussed herein.

FIG. 10 illustrates an example group-based communication interface structured in accordance with various embodiments of the disclosure where a user John Smith has a workspace 1002 with a calendar 1004, channels 1006, and direct messages 1008. The group-based communication interface comprises aggregate calendar event interface 1010 upon selection of calendar 1004.

The workspace 1002 refers to a group of users and a set of work objects all of which are associated with a common group identifier. Workspace 1002 may be used interchangeable with group-based communication interface. In various embodiments, users sharing a group identifier also share work objects. In other words, users sharing a common group identifier that is also shared by a set of work objects may access those work objects to perform actions on those objects, such as viewing messages, posting messages, opening files, and the like.

The channels 1006 are group-based communication channels which, as defined above, refer to virtual communications environments or feeds that are configured to display messaging communications posted by group-based communication channel members. Direct messages 1008 are messages sent directly to and from group-based communication channel members.

The aggregate calendar event interface 1010 that is configured and displayed as a result of one or more client devices 124-128 rendering the received aggregate calendar event interface comprising one or more external calendar event data objects or internal calendar event data objects. As discussed in detail above, the one or more external calendar event data objects or internal calendar event data objects displayed within aggregate calendar event interface 1010 are supplied by the group-based communication server 112. By relying on the aggregate calendar event interface to supply the information for rendering a prioritization score ranking of the one or more external calendar event data objects or internal calendar event data objects, one or more client devices 124-128 may require only a "thin" group-based communication system app running on the one or more client devices 124-128.

For example, the aggregate calendar event interface 1010 displays a list of calendar event renderings for Monday, December 31, 2018 by prioritization score. As shown in FIG. 10, there are three distinct calendar event prioritization groupings: high priority 1012, low priority 1014 and pending events 1016 awaiting user response to accept or decline the calendar event determined by the group-based communication server as being a medium priority event. In some example embodiments, the group-based communication server 112 may be configured to receive user acceptance input associated with the pending event 1016 via the aggregate calendar event interface 1010 of a group-based communication interface and transmit computer coded instructions for rendering the aggregate calendar event interface comprising the pending event 1016 associated with the user acceptance input. In this example, the pending event 1016 may be positioned in between high priority 1012 and low priority 1014 to render a new medium priority section of calendar events.

Within the high priority aggregate calendar event interface 1010 group, there are two identified calendar events identified as being of high importance to the user: project kickoff and 1-on-1 meeting. Requirements analysis calendar event is identified as low priority and is rendered as such by the aggregate calendar event interface 1010.

As described above and as will be appreciated based on this disclosure, embodiments of the present disclosure may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present disclosure have been described above with reference to block diagrams and flowchart illustrations of computer implemented methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 202 and/or group-based communication system data corpus 114 discussed above, to produce a machine, such that the computer program product comprises the computer coded instructions which execute on the computer or other programmable data processing apparatus create a means for implementing the functions specified in the flowchart block or blocks.

These computer program instructions may also be stored in a computer-readable storage device (e.g., memory 204) that can direct a computer or other programmable data processing apparatus to function in a particular manner, such that the computer coded instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the computer coded instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the disclosures set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for validating, aggregating, and managing calendar event data in a group-based communication interface of a group-based communication system, the apparatus comprising at least one processor, and at least one memory having computer instructions therein, with the computer instructions configured to, when executed by the at least one processor, cause the apparatus to:
receive an external calendar event data object from an external calendar resource;
parse the external calendar event data object to identify external calendar event contextual data;
receive a second external calendar event data object from the external calendar resource;
parse the second external calendar event data object to identify second external calendar event contextual data;
identify common identifier data within both of the external calendar event contextual data and the second external calendar event contextual data, the common identifier data comprising a unique user identifier of a user that identifies the user within the group-based communication system;

identify prioritization data by querying a group-based communication system data corpus based on the common identifier data shared between the external calendar event contextual data and the second external calendar event contextual data, the group-based communication system data corpus comprising group-based communication messaging data, group-based communication channel data, and group-based communication work object data;

determine a prioritization score for the external calendar event data object relative to a second prioritization score of the second external calendar event data object based on the external calendar event contextual data, the second external calendar event contextual data, and the prioritization data, wherein the prioritization score is based at least in part on user activity within a group-based communication channel including user access frequency data of the user accessing the group-based communication channel;

cause display of the external calendar event data object in the group-based communication channel within a group-based communication interface based on group-based communication channel settings and a prioritization score ranking, wherein the group-based communication channel is associated with a set of users who are associated with a workspace of the group-based communication system with access to the group-based communication channel;

receive a user acceptance input associated with the external calendar event data object or the second external calendar event data object;

transmit instructions for causing display of an aggregate calendar event interface comprising the external calendar event data object or the second external calendar event data object; and updating the aggregate calendar event interface to include one or more accepted calendar event data objects based on the user acceptance input.

2. The apparatus of claim 1, wherein parsing the external calendar event data object and the second external calendar event data object to identify the external calendar event contextual data and the second external calendar event contextual data, respectively, comprises:

generating a prioritization weight estimate for the prioritization data, wherein the prioritization weight estimate is generated using a prioritization suggestion model; and determining the prioritization score for the external calendar event data object relative to the second prioritization score of the second external calendar event data object based on the generated prioritization weight estimate, the external calendar event contextual data, the second external calendar event contextual data, and the prioritization data.

3. The apparatus of claim 2, wherein the prioritization weight estimate comprises a plurality of topic-related weights for the prioritization data corresponding to a topic work graph determined from the group-based communication system data corpus.

4. The apparatus of claim 2, wherein the prioritization weight estimate comprises a plurality of user-related weights for the prioritization data corresponding to a user work graph determined from the group-based communication system data corpus.

5. The apparatus of claim 2, wherein the prioritization weight estimate comprises a plurality of channel-related weights for the prioritization data corresponding to a channel work graph determined from the group-based communication system data corpus.

6. The apparatus of claim 1, wherein the at least one memory and the computer instructions, when executed by the at least one processor, cause the apparatus to further:

receive feedback data regarding the prioritization score for the external calendar event data object; and modify a prioritization suggestion model using the feedback data.

7. The apparatus of claim 1, wherein the external calendar event contextual data comprises one or more of: event subject information, topic information, event location information, event date and time information, event organizer information, event attendee information and associated attendee responses, event type information, event visibility, reminders, work objects, and event detail information that comprises text, images, audio, and file attachments.

8. The apparatus of claim 7, wherein the work objects comprise one or more of: a file object, a call object, a task object, an event object, a message object, a notification object, a calendar event data object, and an email object.

9. The apparatus of claim 1, wherein the aggregate calendar event interface is configured to display additional accepted calendar event data objects from a plurality of external calendar resources.

10. An apparatus for validating, aggregating, and managing calendar event data in a group-based communication interface of a group-based communication system, the apparatus comprising at least one processor, and at least one memory having computer instructions therein, with the computer instructions configured to, when executed by the at least one processor, cause the apparatus to:

receive an external calendar event data object from a first external calendar resource;

parse the external calendar event data object to identify external calendar event contextual data;

receive a second external calendar event data object from a second external calendar resource;

parse the second external calendar event data object to identify second external calendar event contextual data;

identify common identifier data within both of the external calendar event contextual data and the second external calendar event contextual data, the common identifier data comprising a unique user identifier of a user that identifies the user within the group-based communication system;

identify prioritization data by querying a group-based communication system data corpus based on the common identifier data shared between the external calendar event contextual data and the second external calendar event contextual data, the group-based communication system data corpus comprising group-based communication messaging data, group-based communication channel data, and group-based communication work object data;

determine a prioritization score for the external calendar event data object relative to a second prioritization score of the second external calendar event data object based on the external calendar event contextual data, the second external calendar event contextual data, and the prioritization data;

wherein the prioritization score is based at least in part on user activity within a group-based communication channel including user access frequency data of the user accessing the group-based communication channel; and a cause display of the external calendar event data object in the group-based communication channel within a group-based communication interface based on group-based communication channel settings and a prioritization score ranking, wherein the group-based communication channel is associated with a set of users who are associated with a workspace of the group-based communication system with access to the group-based communication channel;

receive a user acceptance input associated with the external calendar event data object or the second external calendar event data object transmit instructions for causing display of an aggregate calendar event interface comprising the external calendar event data object or the second external calendar event data object; and updating the aggregate calendar event interface to include one or more accepted calendar event data objects based on the user acceptance input.

11. The apparatus of claim 10, wherein parsing the external calendar event data object and the second external calendar event data object to identify the external calendar event contextual data and the second external calendar event contextual data, respectively, comprises:

generating a prioritization weight estimate for the prioritization data, wherein the prioritization weight estimate is generated using a prioritization suggestion model; and determining the prioritization score for the external calendar event data object relative to the second prioritization score of the second external calendar event data object based on the generated prioritization weight estimate, the external calendar event contextual data, the second external calendar event contextual data, and the prioritization data.

12. The apparatus of claim 11, wherein the prioritization weight estimate comprises a plurality of topic-related weights for the prioritization data corresponding to a topic work graph determined from the group-based communication system data corpus.

13. The apparatus of claim 11, wherein the prioritization weight estimate comprises a plurality of user-related weights for the prioritization data corresponding to a user work graph determined from the group-based communication system data corpus.

14. The apparatus of claim 11, wherein the prioritization weight estimate comprises a plurality of channel-related weights for the prioritization data corresponding to a channel work graph determined from the group-based communication system data corpus.

15. The apparatus of claim 10, wherein the at least one memory and the computer instructions, when executed by the at least one processor, cause the apparatus to further:

receive feedback data regarding the prioritization score for the external calendar event data object; and modify a prioritization suggestion model using the feedback data.

16. The apparatus of claim 10, wherein the external calendar event contextual data comprises one or more of: event subject information, topic information, event location information, event date and time information, event organizer information, event attendee information and associated attendee responses, event type information, event visibility, reminders, work objects, and event detail information that comprises text, images, audio, and file attachments.

17. The apparatus of claim 16, wherein the work objects comprise one or more of: a file object, a call object, a task object, an event object, a message object, a notification object, a calendar event data object, and an email object.

18. The apparatus of claim 10 wherein the aggregate calendar event interface is configured to display additional accepted calendar event data objects from a plurality of external calendar resources.

19. An apparatus for validating, aggregating, and managing calendar event data in a group-based communication interface of a group-based communication system, the apparatus comprising at least one processor, and at least one memory having computer instructions therein, with the computer instructions configured to, when executed by the at least one processor, cause the apparatus to:

receive an external calendar event data object from a first external calendar resource;

parse the external calendar event data object to identify external calendar event contextual data;

receive an external work object from a validated external resource;

parse the external work object to identify work object contextual data;

identify common identifier data within both of the external calendar event contextual data and the work object contextual data, the common identifier data comprising a unique user identifier of a user that identifies the user within the group-based communication system;

identify prioritization data by querying a group-based communication system data corpus based on the common identifier data shared between the external calendar event contextual data and the work object contextual data, the group-based communication system data corpus comprising group-based communication messaging data, group-based communication channel data, and group-based communication work object data;

determine a prioritization score for the external calendar event data object relative to a second prioritization score of the external work object based on the external calendar event contextual data, the work object contextual data, and the prioritization data;

wherein the prioritization score is based at least in part on user activity within a group-based communication channel including user access frequency data of the user accessing the group-based communication channel; and cause display of the external calendar event data object in the group-based communication channel within a group-based communication interface based on group-based communication channel settings and a prioritization score ranking, wherein the group-based communication channel is associated with a set of users who are associated with a workspace of the group-based communication system with access to the group-based communication channel;

receive a user acceptance input associated with the external calendar event data object;

transmit instructions for causing display of an aggregate calendar event interface comprising the external calendar event data object; and updating the aggregate calendar event interface to include one or more accepted calendar event data objects based on the user acceptance input.

20. The apparatus of claim 19, wherein parsing the external calendar event data object and the external work object to identify the external calendar event contextual data and the work object contextual data, respectively, comprises:

generating a prioritization weight estimate for the prioritization data, wherein the prioritization weight estimate is generated using a prioritization suggestion model; and determining the prioritization score for the external calendar event data object relative to the second prioritization score of the external work object based on the generated prioritization weight estimate, the external calendar event contextual data, the work object contextual data, and the prioritization data.

* * * * *